United States Patent
Kozaki

(10) Patent No.: US 11,990,754 B2
(45) Date of Patent: May 21, 2024

(54) POWER-SYSTEM STABILIZATION SYSTEM AND POWER-SYSTEM STABILIZATION METHOD

(71) Applicant: Mitsubishi Heavy Industries, Ltd., Tokyo (JP)

(72) Inventor: Tatsuro Kozaki, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 445 days.

(21) Appl. No.: 17/470,108

(22) Filed: Sep. 9, 2021

(65) Prior Publication Data
US 2022/0085609 A1 Mar. 17, 2022

(30) Foreign Application Priority Data
Sep. 11, 2020 (JP) ................. 2020-152717

(51) Int. Cl.
*H02J 3/18* (2006.01)
*H02J 3/38* (2006.01)
*H02J 3/40* (2006.01)

(52) U.S. Cl.
CPC ............ *H02J 3/1885* (2013.01); *H02J 3/381* (2013.01); *H02J 3/40* (2013.01); *H02J 2300/28* (2020.01)

(58) Field of Classification Search
CPC .. H02J 3/1885; H02J 3/381; H02J 3/40; H02J 2300/28; H02J 3/18; H02J 3/38
See application file for complete search history.

(56) References Cited

U.S. PATENT DOCUMENTS

| | | |
|---|---|---|
| 2013/0214537 A1 | 8/2013 | Hashimoto et al. |
| 2018/0152020 A1 | 5/2018 | Kuroda et al. |

FOREIGN PATENT DOCUMENTS

| | | |
|---|---|---|
| JP | 6-269197 A | 9/1994 |
| JP | 8-112000 A | 4/1996 |
| JP | 8-126396 A | 5/1996 |
| JP | 9-285193 A | 10/1997 |
| JP | 10-215521 A | 8/1998 |
| JP | 11-69893 A | 3/1999 |
| JP | 2008-182789 A | 8/2008 |
| JP | 2011-114900 | 6/2011 |
| JP | 2013-520596 A | 6/2013 |
| JP | 2016-208654 A | 12/2016 |
| JP | 2018-61417 A | 4/2018 |
| JP | 2020-65334 A | 4/2020 |

OTHER PUBLICATIONS

Japanese-language Office Action issued in Japanese Application No. 2020-152717 dated Dec. 13, 2022 with English translation (12 pages).

*Primary Examiner* — Robert L Deberadinis
(74) *Attorney, Agent, or Firm* — Crowell & Moring LLP

(57) ABSTRACT

The present invention provides a power-system stabilization system and a power-system stabilization method, which fundamentally solve the problems of insufficiency and fluctuation in the voltage maintenance capacity and the frequency maintenance capacity. A power-system stabilization system of the present invention comprises a synchronous machine to be field-regulated disposed in an electric power station connected to a power system, a magnetic field regulator for controlling the synchronous machine, and a compensation circuit for correcting a control constant of the magnetic field regulator in accordance with a power-system stability maintaining index that is an index reflecting a renewable energy amount in the power system.

28 Claims, 16 Drawing Sheets

FIG. 6

| NO. | NAME | CONTROLLED VARIABLE | MANIPULATED VARIABLE | PURPOSE | CLASSIFICATION OF STABILITY | DESCRIPTION |
|---|---|---|---|---|---|---|
| 1 | AVR: Automatic Voltage Regulator | GENERATOR TERMINAL VOLTAGE | EXCITATION CURRENT OF GENERATOR | MAINTAINING GENERATOR TERMINAL VOLTAGE | STABILITY OF POWER (TRANSIENT) | DEVICE FOR AUTOMATICALLY CONTROLLING EXCITATION CURRENT TO BRING GENERATOR TERMINAL VOLTAGE INTO REFERENCE VALUE |
| 2 | PSVR: Power System Voltage Regulator | SECONDARY VOLTAGE OF MAIN TRANSFORMER | AVR SET VOLTAGE | MAINTAINING SYSTEM VOLTAGE | STABILITY OF VOLTAGE | DEVICE FOR AUTOMATICALLY CONTROLLING BUS VOLTAGE TRANSMITTED TO TRANSMISSION LINE INTO REFERENCE VALUE BY DIRECTLY ADDING CORRECTION SIGNAL OF BUS VOLTAGE TRANSMITTED TO TRANSMISSION LINE TO AVR |
| 3 | AQR: Automatic Reactive Power Regulator | REACTIVE POWER AT PRIMARY SIDE OF MAIN TRANSFORMER | AVR SET VOLTAGE | MAINTAINING SYSTEM VOLTAGE | STABILITY OF VOLTAGE | DEVICE FOR AUTOMATICALLY CONTROLLING EXCITATION CURRENT TO CONTROL REACTIVE POWER OUTPUT FROM GENERATOR INTO REFERENCE VALUE |
| 4 | APFR: Automatic Power Factor Regulator | POWER FACTOR AT PRIMARY SIDE OF MAIN TRANSFORMER | AVR SET VOLTAGE | MAINTAINING SYSTEM VOLTAGE | STABILITY OF VOLTAGE | DEVICE FOR AUTOMATICALLY CONTROLLING EXCITATION CURRENT TO CONTROL POWER FACTOR OF GENERATOR INTO REFERENCE VALUE |
| 5 | PSS: Power System Stabilizer | GENERATED POWER, FREQUENCY | AVR SET VOLTAGE | IMPROVING STABILITY | STABILITY OF VOLTAGE | DEVICE FOR QUICKLY INCREASING EXCITATION CURRENT IN RESPONSE TO VARIATION IN GENERATOR TERMINAL VOLTAGE UPON ACCIDENT, AND INTENSIFYING SYNCHRONIZING POWER BY INCREASING INTERNAL INDUCED VOLTAGE OF GENERATOR SO THAT STABILITY IS IMPROVED |

POWER-SYSTEM STABILIZATION SYSTEM AND POWER-SYSTEM STABILIZATION METHOD

CLAIM OF PRIORITY

The present application claims priority from Japanese Patent Application JP 2020-152717 filed on Sep. 11, 2020, the content of which is hereby incorporated by reference into this application.

BACKGROUND OF THE INVENTION

The present invention relates to a power-system stabilization system and a power-system stabilization method. Specifically, the present invention relates to the power-system stabilization system and the power-system stabilization method, which are suitable for stabilizing the power system especially in circumstances of increasing use of renewable energy in the absence of system stabilization function (voltage regulating function and frequency adjusting function) for the power system.

The power system has been stably operated by timely controlling each of voltage and frequency to the predetermined value in response to variation in the power demand-supply amount. The voltage regulation in the power system has been maintained by mainly regulating magnetic field of the generator in a power plant, and phase modifying facility installed in a substation. The frequency of the power system has been maintained by controlling a demand-supply relation between mechanical inputs and electrical outputs with respect to the generator of the power plant.

Conventional power plants such as thermal power plants, nuclear power plants, and hydroelectric power plants have constituted mainstream power plants each including the system stabilization function for the power system (voltage regulating function and frequency adjusting function). Recently, utilization of renewable energy in the absence of the voltage regulating function or the frequency adjusting function for the power system has been increasing. As a result, the power system on the whole tends to exhibit insufficient capacity of both the voltage regulation and frequency adjustment.

Introduction of the power system that involves renewable energy such as solar power generation and wind power generation has been proposed. An invention disclosed in document JP2016-208654 aims at provision of the power system voltage/reactive power monitoring control device configured to maintain the balance between voltage and reactive power in the power system, and to further improve economic efficiency even in the case of output fluctuation over time in the weather dependent renewable energy, and change in the power supply configuration and system configuration. The document discloses that "the power system voltage/reactive power monitoring control device is configured to give transmission data to the individual device that can adjust the voltage and the reactive power of the power system. The device obtains one or more limited target value using one or more indexes each indicating stability of the power system, acquires information on the target value from the limited target value, gives the transmission data including the information on the target value to the individual device, and allows the individual device to regulate the voltage and the reactive power at the disposed position."

An invention disclosed in document JP2008-182789 aims at provision of the reactive power control system configured to prevent the advanced reactive power, and to set the power factor PF for the reactive power control to 1.0 in the case of controlling the reactive power under AQR control (Automatic Reactive Power Regulator) by executing ON/OFF control of the phase advance capacitor. The document discloses that "the reactive power control system is linked with the commercial power supply, and includes dispersed power supplies for controlling the reactive power of the power receiving point from the commercial power supply under the AQR control using the phase advance capacitor. The system further includes a detector for detecting first reactive power as the reactive power at the power receiving point before execution of the AQR control, the AQR for determining the need of executing the AQR control from the value of the first reactive power, and executing the AQR control, and an AVR for executing AVR control prior to the AQR control executed by the AQR to correct the first reactive power value to the value of the reactive power that can be offset under the AQR control.

Utilization of renewable energy is expected to be further increased in the future. It is estimated that by the year 2050, the renewal energy accounts for about 50% of the overall energy.

The above-described rate is expected to become not only higher but also fluctuate largely. During the daytime of a day for generating solar power, the renewable energy including the wind power generation accounts for a larger portion in the overall energy. During the nighttime when solar power is not generated, the renewable energy mainly generated by the wind power accounts for relatively a smaller portion in the overall energy. The fluctuation as described above may occur not only daily but also monthly, seasonally, or regionally.

The future change in the power system configuration is expected to bring several obstacles in maintenance of voltage and frequency in the power system. If the conventional power plant is partially disconnected from the power system to drop the power system voltage, it is difficult to recover from the voltage drop. This is attributable to deterioration in the voltage maintenance capacity of the power system as a whole. Improvement in the voltage maintenance capacity and the frequency maintenance capacity (increase in generation capacity and capacity of the phase modifying facility of the conventional power plant) may be considered as countermeasures for such failure. However, provision of the facility to cope with the severest condition which fluctuates in a day is hardly advantageous in terms of cost.

Document JP2016-208654 discloses that the power system is entirely monitored individually to control local problems. The disclosed control fails to provide the fundamental solution of the problem of insufficient voltage maintenance capacity, and fluctuation of such capacity in the power system as a whole. Document JP2008-182789 discloses the use of the phase modifying facility. However, the disclosed approach is not effective for solving the problem of insufficient voltage maintenance capacity, and fluctuation of such capacity. Implementation of the approach demands the installed capacity adapted to the severest condition. This may unavoidably result in high cost.

SUMMARY OF THE INVENTION

The present invention provides a power-system stabilization system and a power-system stabilization method, which fundamentally solve the problems of insufficiency and fluctuation in the voltage maintenance capacity and the frequency maintenance capacity.

The present invention provides a power-system stabilization system comprising a synchronous machine to be field-regulated disposed in an electric power station connected to a power system, a magnetic field regulator for controlling the synchronous machine, and a compensation circuit for correcting a control constant of the magnetic field regulator in accordance with a power-system stability maintaining index that is an index reflecting a renewable energy amount in the power system.

The present invention provides a power-system stabilization system comprising a synchronous machine driven by a prime mover, the synchronous machine disposed in an electric power station connected to a power system, a prime mover control device for controlling the prime mover, and a compensation circuit for correcting a control constant of the prime mover control device in accordance with a power-system stability maintaining index that is an index reflecting a renewable energy amount in the power system.

The present invention provides a power-system stabilization system comprising a reactive power compensation device including a capacitor and a power semiconductor, the reactive power compensation device disposed in an electric power station connected to a power system, a reactive power control device for controlling the reactive power compensation device, and a compensation circuit for correcting a control constant of the reactive power control device in accordance with a power-system stability maintaining index that is an index reflecting a renewable energy amount in the power system.

The present invention provides a power-system stabilization method for a power system which an electric power station is connected to, the electric power station including a synchronous machine to be field-regulated, the synchronous machine being controlled by a magnetic field regulator, wherein a control constant of the magnetic field regulator is corrected in accordance with a power-system stability maintaining index that is an index reflecting a renewable energy amount in the power system.

The present invention provides a power-system stabilization method for a power system which an electric power station is connected to, the electric power station including a synchronous machine driven by a prime mover, the prime mover being controlled by a prime mover control device, wherein a control constant of the prime mover control device is corrected in accordance with a power-system stability maintaining index that is an index reflecting a renewable energy amount in the power system.

The present invention provides a power-system stabilization method for a power system which an electric power station is connected to, the electric power station including a reactive power compensation device including a capacitor and a power semiconductor, the reactive power compensation device being controlled by a reactive power control device, wherein a control constant of the reactive power control device is corrected in accordance with a power-system stability maintaining index that is an index reflecting a renewable energy amount in the power system.

The present invention provides a power-system stabilization system and a power-system stabilization method, which fundamentally solve the problems of insufficiency and fluctuation in the voltage maintenance capacity and the frequency maintenance capacity of the power system.

BRIEF DESCRIPTION OF THE DRAWINGS

FIG. 6 is a table that lists the respective control devices in a magnetic field regulator 5, each contributing to maintenance of the power system voltage;

DETAILED DESCRIPTION OF THE PREFERRED EMBODIMENTS

Hereinafter, embodiments of the present invention will be described.

For the purpose of solving the problem as described above, the present invention proposes to define the power-system stability maintaining index VRI as an index reflecting the renewable energy amount in the power system, and to execute the control so that power system stability is improved in accordance with the VRI.

Specifically, the present invention relates to the magnetic field regulator of the generator for securing the voltage regulating function in accordance with the power-system stability maintaining index VRI, or relates to the power demand-supply adjusting function between mechanical inputs and electrical outputs with respect to the generator for securing the frequency adjusting function in accordance with the power-system stability maintaining index VRI. The present invention further relates to the phase modifying function in the substation for securing the voltage regulating function in accordance with the power-system stability maintaining index VRI.

Hereinafter, a relation between the magnetic field regulation and power stability of the generator will be preliminarily defined as the background information on embodiments of the present invention. Generally, an approach of regulating the voltage of the power system includes a method of controlling the phase modifying facility in the substation, and a method of controlling the generator in the power plant. The latter method will be mainly described hereinafter.

Figure 1:
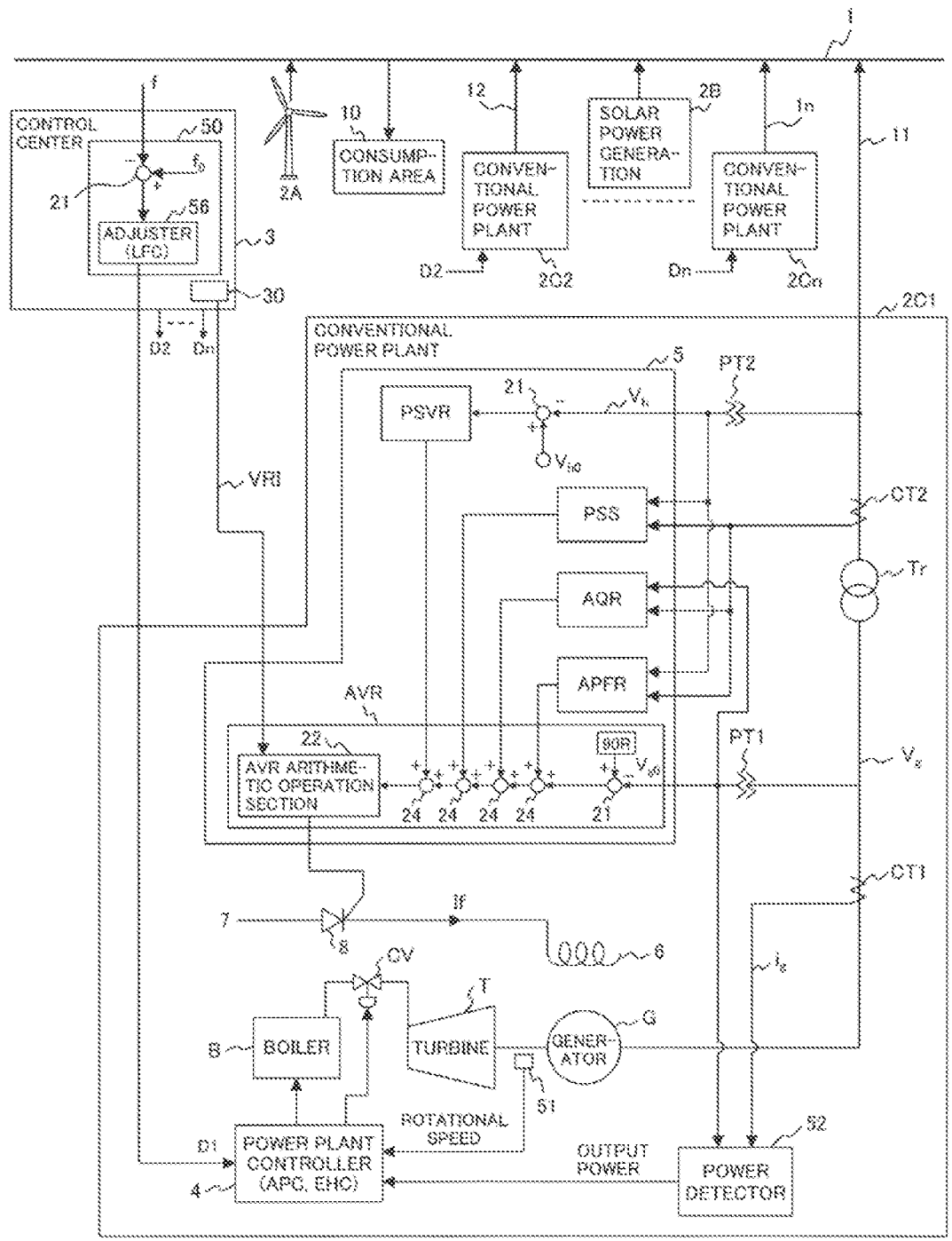
FIG. 1 illustrates an exemplary structure constituted by generally employed power system and control devices.

FIG. 1 illustrates an exemplary structure of a generally employed power system and control devices. A power system 1 in the drawing is linked with many power plants including those having no system stabilizing functions (voltage regulating function and frequency adjusting function), for example, a wind power plant 2A and a solar power plant 2B for generating renewable energy as well as the conventional power plants 2C (2C1, 2C2 . . . 2Cn) having system stabilizing functions (voltage regulating function and frequency adjusting function), for example, a thermal power plant, a hydroelectric power plant, and a nuclear power plant.

A control center 3 for controlling the entire power system includes a central control function section 50 provided with an adjuster 56 for generating output command values D (D1, D2 . . . Dn) by obtaining a difference between a detected system frequency f and a constant frequency f0 using a subtractor 21 so that the command is given to the conventional power plant 2C. The above-described function of the central control function section 50 is referred to as a load frequency control LFC (Load Frequency Control).

A VRI arithmetic operation section 30 for calculating the power-system stability maintaining index VRI is disposed in the control center 3. The VRI arithmetic operation section 30 will be described later in detail.

A power plant controller 4 in the conventional power plant 2C controls steam input from a boiler B to a turbine T and the generator G, which are mechanically connected using a steam control valve CV. The rotational speed obtained by a rotational speed detector 51 and output power derived from a power detector 52 are controlled as feedback values using the output command value D as a target value. The power detector 52 obtains the output power from the terminal voltage Vg of the generator G, which has been derived from a voltage transformer PT1, and the terminal current Ig of the generator G, which has been derived from a current transformer CT1. The output power from the generator G is supplied to the power system 1 via a transformer Tr, and transmission lines 11, 12 . . . ln. The boiler and the steam turbine have been described as objects to be controlled by the power plant controller 4. It is possible to control a recovered waste heat utilizing facility including a waste heat recovery boiler and the steam turbine for generating steam using waste heat of the gas turbine. The main control function of the power plant controller 4 includes an automatic plant control device APC (Automatic Plant Control), and a turbine controller EHC (Electro-Hydraulic Control System).

The magnetic field regulator 5 in the conventional power plant 2C includes a magnetic field coil 6 as a secondary winding of a synchronous generator G. A thyristor 8 rectifies an AC generator 7 into DC current, and regulates the DC magnetic field current If applied to the magnetic field coil 6 by the automatic voltage regulator AVR (Automatic Voltage Regulator) as the main regulating function of the magnetic field regulator 5 so that the generator terminal voltage Vg is adjusted to a set voltage Vg0.

The magnetic field regulator 5 having the automatic voltage regulator AVR as the main control function constitutes a serial regulator for substantially correcting the target value of the automatic voltage regulator AVR in response to the command of a host control system. The host control system is a control device such as a power system voltage regulator PSVR, a power system stabilizer PSS, an automatic reactive power regulator AQR, and an automatic power factor regulator APFR as illustrated in FIG. 1. Commands from those devices substantially correct the target value of the automatic voltage regulator AVR as a subordinate control system.

The correction process includes the process for directly correcting the target value by moving a target voltage setting unit 90R of the automatic voltage regulator AVR, and the process for executing addition-subtraction with respect to the voltage deviation. FIG. 1 illustrates the process in which an adder 24 executes the addition-subtraction with respect to the voltage deviation. However, it is possible to execute the correction by changing the target value. The automatic voltage regulator AVR allows the voltage transformer PT1 to detect the terminal voltage Vg of the generator G as the synchronous unit, and allows the subtractor 21 to obtain a difference between the terminal voltage Vg and the set voltage Vg0 set by the target voltage setting unit 90R. The automatic voltage regulator adjusts the thyristor 8 via an adjuster (AVR arithmetic operation section) 22 having a proportional integral function to adjust the magnetic field current If to be applied to the magnetic field coil 6. Other control systems will be described later in detail referring to the drawings. Signals to be input to other control systems include the terminal voltage Vg of the generator G from the voltage transformer PT1, a bus voltage Vh from a voltage transformer PT2, and the terminal current Ig of the generator G from a current transformer CT2.

Figure 2:
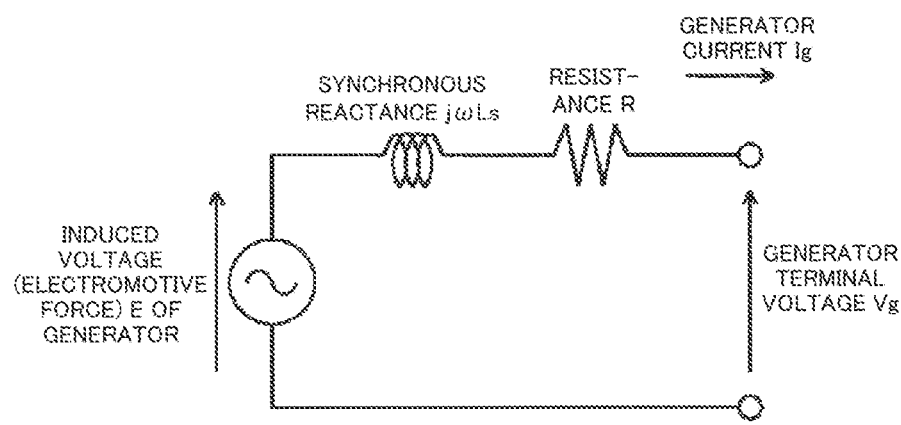
FIG. 2 illustrates an equivalent circuit of a generator G when a terminal is opened.

FIG. 2 represents an equivalent circuit of the generator G when the terminal is opened. Referring to the drawing, the generator G may be expressed as a series circuit of an internal induced voltage E (electromotive force) inside the generator, a synchronous reactance $Xs=j\omega Ls$, and a resistance R. The generator current Ig and the generator terminal voltage Vg are externally measurable values. The internal induced voltage E is obtained as an estimated value derived from the synchronous reactance $Xs=j\omega Ls$, the resistance R, the generator current Ig, and the generator terminal voltage Vg. The angular frequency $\omega$ is expressed by the equation $\omega=2\pi f$. The frequency is denoted by f.

Figure 3:
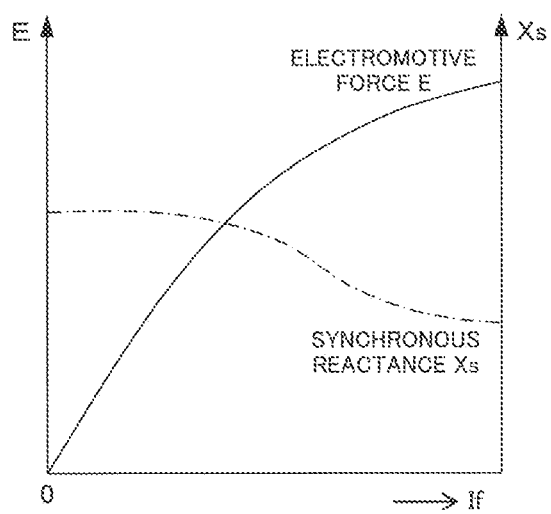
FIG. 3 represents each relation between a magnetic field current If and an electromotive force E, and between a magnetic field current If and a synchronous reactance Xs.

FIG. 3 represents each relation of the magnetic field current If as the x-axis with the electromotive force E and the synchronous reactance Xs each as the y-axis. As the magnetic field current If increases, the electromotive force E exhibits saturation characteristics, and the synchronous reactance Xs is on a declining trend.

Figure 4:
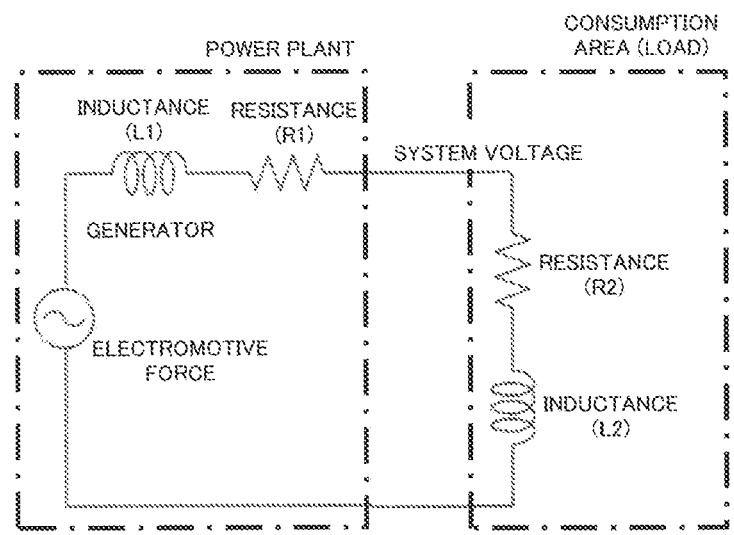
FIG. 4 illustrates an equivalent circuit from the generator to the load as a consumption area.

FIG. 4 illustrates an equivalent circuit from the generator to the load as the consumption area. The inductance in the generator is designated as L1, the resistance is designated as R1, the inductance at the load side is designated as L2, and the resistance is designated as R2. Referring to the equivalent circuit of FIG. 4, a time constant $\tau$[sec] indicating the follow-up speed of the system voltage V to the electromotive force E of the generator may be derived from the equation (1):

$$\tau[sec]=(L1+L2)/(R1+R2). \tag{1}$$

Figure 5:
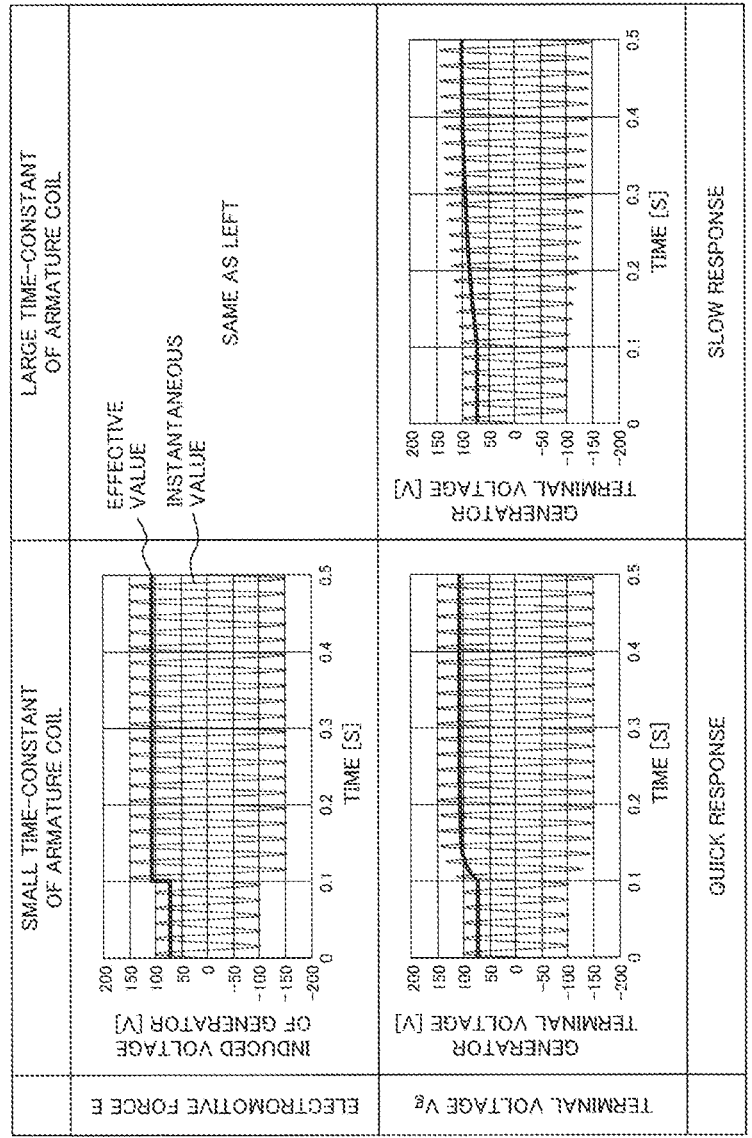
FIG. 5 illustrates each response characteristic of the electromotive force E and a terminal voltage Vg with respect to a time constant z of an armature coil.

FIG. 5 represents each response characteristic of the electromotive force E and the terminal voltage Vg with respect to cases where the time constant $\tau$ of the armature coil is large and small. The upper left section represents instantaneous values and effective values obtained by increasing the maximum value of the electromotive force E from 100% to 150% at a time point of 0.1 seconds. The condition applies to the case of large time constant T as represented by the upper right section. In order to distinguish between the instantaneous value and the effective value, the effective value is indicated with a thick line, and the instantaneous value is indicated with a thin line. As for the terminal voltage Vg, in the case of small time constant T, the response of the system voltage V to the electromotive force E of the generator is accelerated (reaches the final value immediately) as the lower left section indicates. Meanwhile, in the case of the large time constant T, the response is slow, taking time to reach the final value as the lower right section indicates. That is, the response speed of the system voltage V to the electromotive force E of the generator is not kept constant but varies with the magnetic field current If.

In this case, the control gain (Ka or the like) for the voltage maintaining function is a fixed value. In practical designing of the control device, the relevant proportional gain is determined on the assumption of the representative control state (time constant of the circuit).

In the case of upcoming increase in utilization of the renewable energy, the generator magnetic field current, synchronous reactance, and the reaction time constant of the generator are expected to be largely changed to maintain voltage of the power system. Such values significantly differ from those derived from preliminarily designed control operations, resulting in failure of appropriate control operations.

On the basis of the above-described findings, in the voltage control to be executed according to the present invention, the control constant of the magnetic field regulator for voltage maintenance is changed in accordance with the power-system stability maintaining index VRI. The control constant includes the proportional gain Ka in the proportional control, the integral gain Ki and an integration time constant Ti in the integral control. In the following description, the process for changing the proportional gain Ka will be mainly described. The case for changing the control constant including the integration time constant Ti (integral gain Ki=1/integration time constant Ti) will be described in a ninth embodiment onward referring to FIG. 13.

Referring back to FIG. 1, the magnetic field regulator 5 is formed by combining a plurality of control devices including the automatic voltage regulator AVR as a main control device. FIG. 1 illustrates an example of the magnetic field regulator 5 including the control devices such as the power system voltage regulator PSVR, the power system stabilizer PSS, the automatic reactive power regulator AQR, and the automatic power factor regulator APFR. Inputs and processing details with respect to each of the control devices will be described individually. Outputs generated by those devices are structured to control the magnetic field current of the generator via the control device of the automatic voltage regulator AVR in the end.

FIG. 6 is a table that lists examples of the control devices in the magnetic field regulator 5, which contribute to the voltage maintenance of the power system. Details of the magnetic field regulator are summarized with respect to the controlled variable, operation amount, control target, and the like. Referring to the table, the controlled variables are diversified depending on the respective control targets. Meanwhile, the operation amount serves to directly control the magnetic field current of the generator, or indirectly control the magnetic field current of the generator via the automatic voltage regulator AVR.

The present invention will be described in due succession. In the first and the second embodiments, explanations will be specifically made with respect to the power-system stability maintaining index VRI reflecting the renewable energy amount in the power system, and the automatic voltage regulator AVR in the magnetic field regulator 5 for improving especially the voltage stability of the power system.

In the third embodiment, an explanation will be made with respect to employment of a distribution type system configuration for obtaining the power-system stability maintaining index VRI.

In the fourth to the eighth embodiments, explanations will be made with respect to the power-system stability maintaining index VRI applied to the magnetic field regulating device in the magnetic field regulator 5 except the automatic voltage regulator AVR.

In the ninth to the eleventh embodiments, explanations will be made concerning the demand-supply adjustment function between the mechanical input and the electrical output with respect to the generator for securing the frequency adjusting function in accordance with the power-system stability maintaining index VRI.

In the twelfth embodiment, an explanation will be made with respect to the case applied to other devices.

The power-system stabilization system according to the present invention includes a main machine and control devices. In the power plant, the main machine includes a generator and a prime mover such as a turbine and a boiler for applying the mechanical inputs to the generator. In the case of improving stability of frequency in the power system, the control device includes a prime mover control device. In the case of improving stability of voltage, the control device includes the magnetic field regulator. In the case of a phase modifying function, the main machine constitutes a main part of the synchronous phase modifier (rotary capacitor), STATCOM (self-excited static reactive power compensation device), and SVC, which are connected to the power system. The control devices are operated for controlling the voltage and the reactive power. The power-system stabilization system according to the present invention is configured to make stability both in frequency and voltage adjustable through association of the main machine with the control devices.

Similarly, the power-system stabilization method according to the present invention is provided. The power-system stabilization system includes the main machine and the control devices. The main machine includes the generator and the prime mover such as the turbine and the boiler for applying the mechanical inputs to the generator. In the case of improving stability of frequency in the power system, the control is executed by the prime mover control device. In the case of improving stability of voltage, the control device includes the magnetic field regulator. In the case of the phase modifying function, the main machine constitutes the main part of the synchronous phase modifier (rotary capacitor), STATCOM, and SVC, which are connected to the power system. The control devices are operated for controlling the voltage and the reactive power. The power-system stabilization method according to the present invention makes stability both in frequency and voltage adjustable through association of the main machine with the control devices.

First Embodiment

In the first embodiment of the present invention, the control gain of the adjuster of the magnetic field regulator is changed in accordance with the renewable energy composition ratio M as the power-system stability maintaining index VRI reflecting the renewable energy amount in the power system. Hereinafter, an explanation will be made with respect to definition of the renewable energy composition ratio M, and the process for obtaining the ratio.

The renewable energy composition ratio M is derived from the VRI arithmetic operation section 30 disposed in the central device such as the control center 3 as illustrated in FIG. 1. It is preferable to dispose the VRI arithmetic operation section 30 in the central device because most of the information of the power system 1 as the control target is integrally input. The renewable energy composition ratio M derived from the VRI arithmetic operation section 30 as illustrated in FIG. 1 is given to the magnetic field regulator 5 of the generator G in the preliminarily determined specific power plant (2C1 in the example as illustrated in FIG. 1).

The renewable energy composition ratio M is defined by the equation (2):

Renewable energy composition ratio $M$ (;power-system stability maintaining index VRI)=power generation amount utilizing renewable energy/ (power generation amount utilizing renewable energy+power generation amount of conventional power plant). (2)

The power generation amount utilizing renewable energy and power generation amount of conventional power plant, which are basic data for obtaining the renewable energy composition ratio M by arithmetic operation are obtained by the VRI arithmetic operation section 30 which adds up power generation amounts of the respective power facilities, which have been input to the central device such as the control center 3 via communication so that the ratio of the power generation amount utilizing renewable energy to the total amount is obtained. In most cases, each communication facility is installed between the existing conventional power plant and the central device, and between the large capacity renewable energy facility and the central device. It is therefore possible to perform the arithmetic operation based on the above-described data collection and allocation of the arithmetically operated results.

Typically, the small-size renewable energy facility, for example, the solar power generation system installed in a general home is not provided with the communication facility. In order to obtain the stricter value of the renewable energy composition ratio M, it is necessary to take into account circumstances as described above. It is known that the power generation amount of the solar power generation system connected to the power distribution cable is estimated by the individual substation.

For example, the active power P and the reactive power Q are measured in the respective substations to obtain a relation between no-load characteristic of the power distribution cable displayed in a PQ plane of the active power P and the reactive power Q, and a load point defined by the active power P and the reactive power in the same plane. Based on the relation, the detected active power is corrected to estimate the solar power generation amount. It is also possible to obtain a load amount of the estimated power distribution cable (corresponding to the power generation amount of the conventional power plant) from the detected active power and the estimated solar power generation amount. Using the total of results from all the substations, the equation (2) can be executed.

The equation (2) is sequentially executed at a frequency in accordance with, for example, the control period of the calculator. The processing results are continuously reflected on the magnetic field regulator 5 of the generator G in each of the conventional power plants time-serially so that fluctuation in the power system is converged in a short time.

The renewable energy composition ratio M derived from the equation (2) is given to the magnetic field regulator 5 of the generator in the predetermined specific power plant. The magnetic field regulator 5 includes a plurality of magnetic field regulators. The first embodiment relates to the automatic voltage regulator AVR as the specific target to be adjusted in the magnetic field regulator 5.

Figure 7:
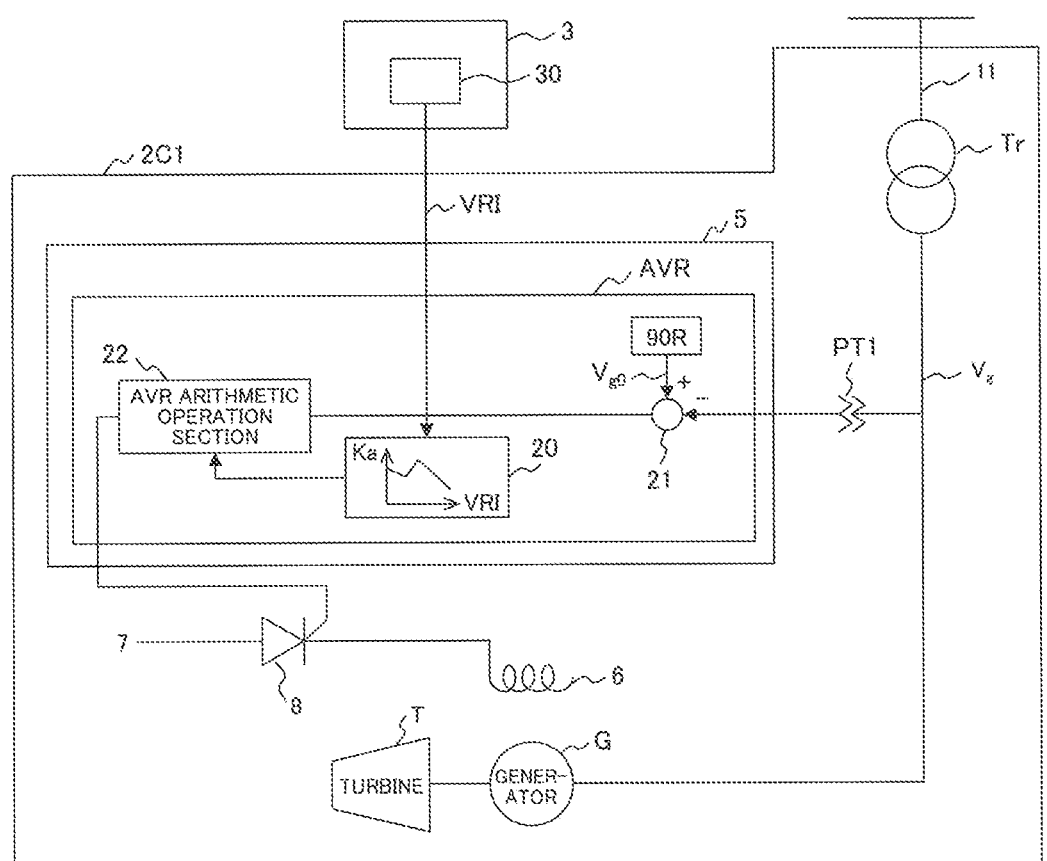
FIG. 7 illustrates an exemplary structure of the magnetic field regulator of the generator according to a first embodiment of the present invention.

FIG. 7 illustrates an exemplary structure of the magnetic field regulator of the generator according to the first embodiment of the present invention. The automatic voltage regulator AVR as illustrated in FIG. 7 detects the terminal voltage Vg of the generator G of synchronous type through the voltage transformer PT1, obtains a difference between the terminal voltage Vg and the set voltage Vg0 set by the target voltage setting unit 90R through the subtractor 21, adjusts the thyristor 8 via an adjuster (AVR arithmetic operation section) 22 with proportional integral function, and adjusts the magnetic field current If to be given to the magnetic field coil 6. The AVR arithmetic operation section 22 may be configured to include an advance-delay compensation circuit within an AVR control device.

The automatic voltage regulator AVR is disposed in the magnetic field regulator 5 of the synchronous machine G. It is configured to execute the function for maintaining the voltage of the synchronous machine G constant in the steady operation state so that stability of dynamic state is improved by maintaining the voltage upon change in the load, and adjusting the reactive power. It is further configured to execute the function for recovering the voltage immediately from the sudden voltage change to achieve the object of improving transient stability by suppressing rise in voltage upon the load shutdown. In order to achieve the object, the automatic voltage regulator AVR is required to lower the total voltage fluctuation ratio (control deviation), exhibit sufficient adaptability, and have sufficient stability as the control system (stabilized margin both in gain and phase).

In the present invention, the control constant (proportional gain Ka, integration time constant Ti) of the adjuster 22 having the proportional integral function in the automatic voltage regulator AVR is changed in accordance with the renewable energy composition ratio M (;power-system stability maintaining index VRI). In this case, an explanation will be made with respect to the process of changing the proportional gain Ka. A compensation circuit 20 to be used is formed as a function generator configured to receive an input of the renewable energy composition ratio M so that the proportional gain Ka of the adjuster 22 is changed. The function is expressed as an equation (3):

$$Ka[A/V]=f(M). \quad (3)$$

The function is characterized to make the proportional gain Ka of the adjuster 22 small as increase in the renewable energy composition ratio M. The characteristic of the function is preliminarily determined through simulation or testing. It is preferable to determine the function through learning control. Learning control is designed to allow the controller or the control system to store the relation between the control scheme and control results, based on which the control scheme is improved. The learning control is utilized in the case where appropriate control scheme cannot be preliminarily designed because of incomplete understanding of characteristics and surrounding environment of the control target. Learning functions allow the system to be immediately adaptable to the situation which has been experienced in the past or the similar situation, and further allow the system to be adaptable to the totally unexperienced situation step by step. The thus determined function is generally in the form of polygonal line type.

The equation (3) is used to change the proportional gain Ka of the adjuster 22 having proportional integral function within the automatic voltage regulator AVR. It is possible to change the integration time constant Ti of the adjuster 22 having the proportional integral function. Generally, as the proportional gain Ka and the integration time constant Ti are used for different functions, preferably, each of the compensation circuits 20 provided for the proportional gain Ka and the integration time constant Ti is different from each other. The compensation circuit 20 may be configured to compensate the proportional gain Ka or/and the integration time constant Ti. When compensating both values, two compensation circuits have to be prepared.

In the present invention, a term that generalizes the proportional gain Ka and the integration time constant Ti is referred to as a control constant of the adjuster 22. This applies to the case of changing the control constant of the adjuster for each of the respective control devices as described later. In the case of a plurality of control constants to be compensated, the compensation circuit 20 may be prepared for each of the respective control constants. Change in the integration time constant Ti represents a change in the integration time constant.

In general, the generator in the present invention refers to the synchronous machine. From the viewpoint as mentioned above, the generator includes the synchronous phase modifier. The synchronous phase modifier is configured by connecting the synchronous motor to the power system under no load state. When the magnetic field of the synchronous modifier is in the overexcitation state, it is operated to serve as the capacitor for taking leading current from the line. When the magnetic field of the synchronous modifier is in the under-excitation state, it is operated to serve as the coil for taking lagging current from the line. When the power system is in the overload state, the load power factor of the line is decreased toward the lagging direction. The synchronous modifier is then brought into the overexcitation state to improve the load power factor so that the problem of the line voltage drop is solved. If the line charging current is high when the power system is in the light-load state, the line load power factor is decreased toward the leading direction. The synchronous modifier is then brought into the under-excitation state to improve the load power factor so that increase in the line voltage is suppressed. The synchronous modifier is provided with the automatic voltage regulator AVR for executing the voltage constant control. Accordingly, the compensation control as described in the first embodiment may be directly applied.

In the first embodiment of the present invention, the gain Ka of the automatic voltage regulator AVR can be automatically changed to an optimum value even in the case where utilization of the renewable energy in the system increases, the voltage of the power system largely fluctuates, and the magnetic field current of the generator is changed to vary control characteristics of the generator and the automatic voltage regulator AVR. It is possible to control the voltage of the power system stably and immediately to the intrinsic value, that is, improve robustness.

Second Embodiment

In the first embodiment, the proportional gain Ka of the adjuster of the magnetic field regulator is changed in accordance with the renewable energy composition ratio M as the power-system stability maintaining index VRI. In the second embodiment, the proportional gain Ka of the adjuster of the magnetic field regulator is changed in accordance with a voltage variation degree N as the power-system stability maintaining index VRI.

In this case, the VRI arithmetic operation section 30 disposed in the central device such as the control center 3 as illustrated in FIG. 1 obtains the voltage variation degree N as described below, and gives the result to the magnetic field regulator 5 of the generator in each of the conventional power plants.

The voltage variation degree N is obtained through a series of processing to be described below. The standard deviation $\sigma$ is derived from the equation (4):

$$\text{Standard deviation } \sigma[V] = \text{STD [power system voltage } (t)\text{–reference value of power system voltage]}. \quad (4)$$

The term STD refers to the equation for obtaining the standard deviation. In the case of no voltage variation, $\sigma=0$ is obtained. In the case of large voltage variation, the value of $\sigma$ becomes large (only positive value).

A proportional integral of the standard deviation derived from the equation (4) is obtained through an equation (5):

$$\text{voltage variation degree } N \text{ (;power-system stability maintaining index VRI)} = Ka \times (\sigma s - \sigma) + (1/Ti) \times \int (\sigma s - \sigma) dt. \quad (5)$$

The obtained result is set as the power-system stability maintaining index VRI expressed by the voltage variation degree N. The control arithmetic operation is executed so that the expression of $\sigma s - \sigma$ becomes zero. The term Ka refers to the proportional gain, Ti refers to the integral time, and t refers to time.

In the magnetic field regulator 5 of the generator in each of the power plants, the control gain is changed in accordance with the value of the voltage variation degree N, similarly to the case of using the renewable energy composition ratio M.

The term "voltage" described in the second embodiment refers to the voltage at a single point or voltages at a plurality of predetermined points expected in the power system. Variation in the voltage at the point is continuously monitored so that the voltage variation degree N is time-serially obtained. The predetermined point does not correspond to the one with specific geographical name. They may be located at an infinite position, or at a virtual point defined by the gravity center position of the impedance on the power system, for example.

In the second embodiment of the present invention, if utilization of the renewable energy in the system is increased to lower the overall voltage maintaining force, the control gain for voltage maintaining function is made optimum in accordance with the state of the power system. Even if disturbance of certain type is applied to the power system, the power system voltage may be controlled to the intrinsic value stably and immediately. In other words, it is possible to improve robustness.

The equation (4) is employed for obtaining the voltage variation degree N (power-system stability maintaining index VRI) from the standard deviation of the voltage deviation. This applies to the case for obtaining frequency variation degree N' from the frequency deviation based on the similar concept. Such index can be generalized as a stability variation degree.

The power-system stability maintaining index VRI represents the concept including the renewable energy composition ratio M and the stability variation degree (voltage variation degree N, frequency variation degree N') described above. The index represents the stability maintaining capacity of the power system, which reflects the renewable energy amount. As the renewable energy accounts for a larger portion in the power system, the voltage variation is more likely to occur, and the response is lowered as well.

Third Embodiment

The first and the second embodiments are configured on the assumption that the communication control system is of centralized type as the generally employed system, in which most of the information of the power system 1 as the control target is integratedly input to the central device such as the control center 3. Meanwhile, in most cases, the recently employed communication control system is of distribution type on the ground of change in communication environments such as internet and cloud, and improvement in the calculation capability of the calculator.

In the system of distribution type according to the third embodiment, the computing unit of the generator downloads the required information from the respective plants on the cloud to obtain the power-system stability maintaining index VRI so that its own magnetic field regulating function is controlled. In this case, the respective plants on the cloud mainly represent electric power stations such as other power plants or substations in the power system. Each of the electric power stations stores the power system information measured by itself in the database of the corresponding electric power station so that such information is shared in response to the request from the other station. The present invention is applicable to the communication/calculator system of either centralized type or distribution type.

Fourth Embodiment

In the fourth to the seventh embodiments, explanations will be made with respect to the process of changing the control gain of each adjuster of the respective control devices in the magnetic field regulator 5 in accordance with either the renewable energy composition ratio M of the first embodiment, or the stability variation degree of the second embodiment (voltage variation degree N, frequency variation degree N') as the power-system stability maintaining index VRI.

The fourth embodiment relates to the power system voltage regulator PSVR as the specific regulation target. Referring to FIG. 1, in the magnetic field regulator 5, an output from the power system voltage regulator PSVR is added to the voltage deviation of the automatic voltage regulator AVR so that the added result is input.

The power system voltage regulator PSVR is configured to control the magnetic field current If of the generator in accordance with the deviation between the bus voltage Vh transmitted to the transmission line, which has been obtained by the voltage transformer PT2 disposed at the secondary side of the transformer Tr, and the reference voltage Vh0, and to maintain the bus voltage Vh transmitted to the transmission line to the reference value Vh0. The bus voltage transmitted to the transmission line refers to the linkage point voltage to the power system. In simple words, the automatic voltage regulator AVR controls the generator terminal voltage Vg to a constant value. Meanwhile, the power system voltage regulator PSVR controls the bus voltage Vh to a constant value.

Figure 8A:
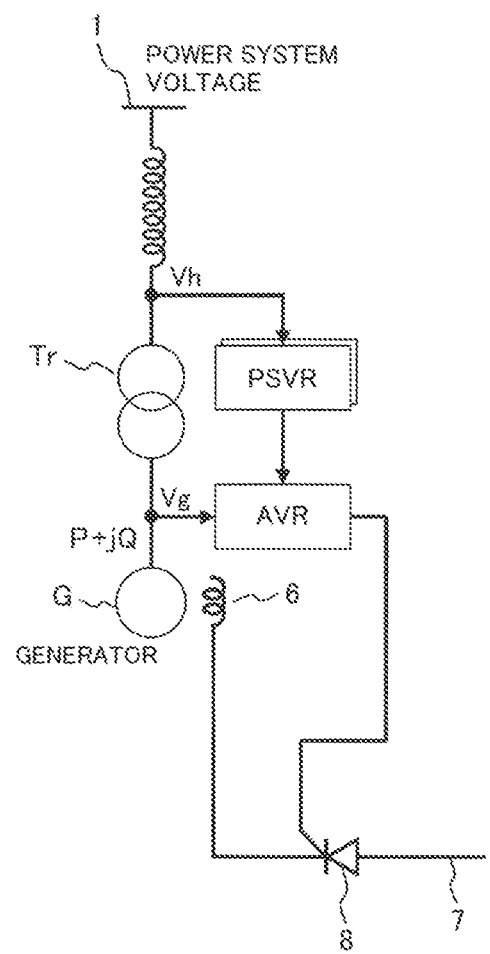
FIG. 8A represents a one-generator-to-infinite-system model indicating a relation between the generator and the power system.
Figure 8B:
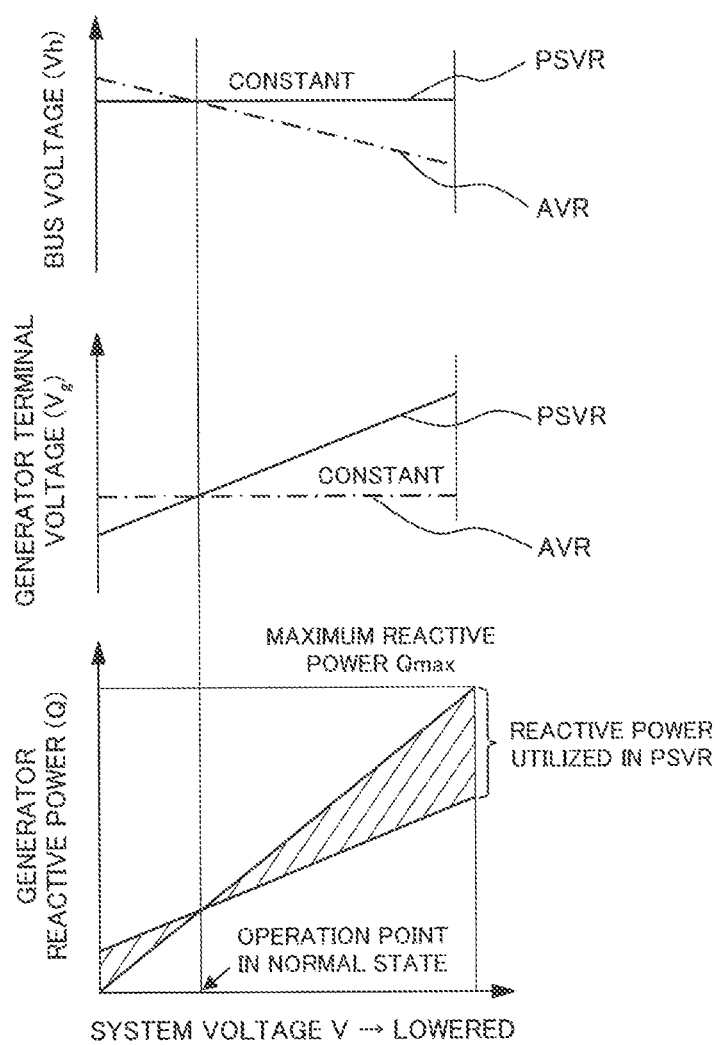
FIG. 8B represents a relation of each of a bus voltage transmitted to a transmission line, a generator terminal voltage, and generator reactive power with system voltage drop under each control operation executed by a power system voltage regulator PSVR and an automatic voltage regulator AVR.

A mechanism of the power system voltage regulator PSVR will be described referring to FIGS. 8A and 8B. FIG. 8A represents a one-generator-to-infinite-system model indicating the relation between the generator and the power system. FIG. 8B represents a relation of each of the bus voltage transmitted to the transmission line (upper section), the generator terminal voltage (middle section), and the generator reactive power (lower section) with the system voltage drop under the control executed by the power system voltage regulator PSVR indicated with solid line, and the control executed by the automatic voltage regulator AVR indicated with dashed line, respectively.

In the normal system voltage operation range, both control operations are brought into substantially the same operation states. Upon the system voltage drop, the power system voltage regulator PSVR serves to control the transmission voltage to the constant value so that the reactive power is increased by automatically raising the generator voltage by the amount equivalent to the reactance drop of a booster transformer.

Meanwhile, since the automatic voltage regulator AVR serves to control the generator terminal voltage Vg to the constant value, the transmission voltage drops in proportion to the transmission voltage drop because of little generation of reactive power. Accordingly, the power system voltage regulator PSVR is intended to raise the transmission voltage by generating more reactive power as indicated with the shaded part, and to alleviate the system voltage drop by keeping the voltage constant so that voltage stability of the entire system is improved.

Figure 9:
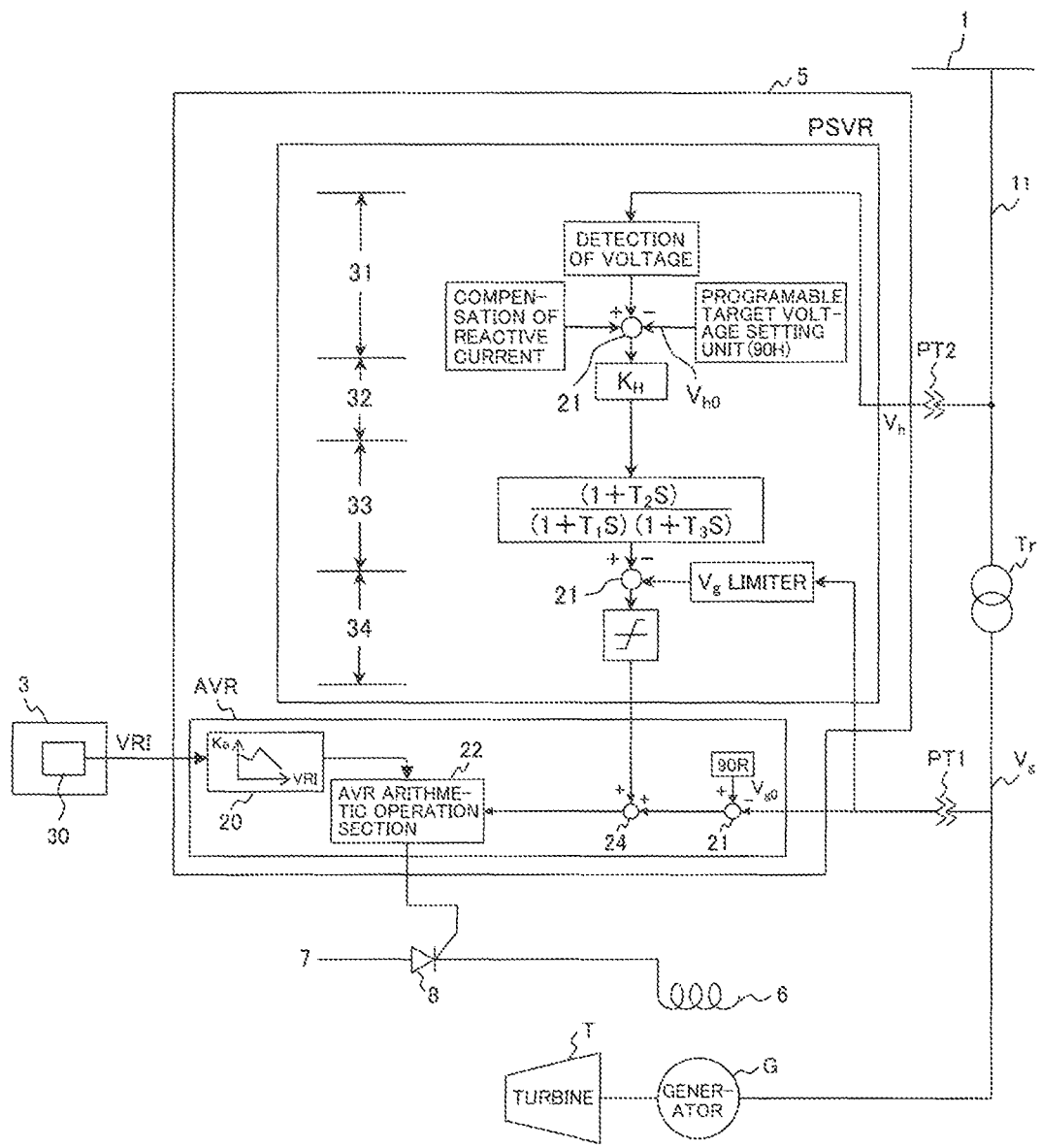
FIG. 9 illustrates an exemplary structure of a generally employed power system voltage regulator PSVR.

FIG. 9 illustrates an exemplary structure of the generally employed power system voltage regulator PSVR. Referring to the exemplary circuit structure, the power system voltage regulator PSVR includes a voltage detection reference voltage setting section 31, a reactive power distributor 32, an advance-delay phase compensation circuit section 33, and an output limiter 34. The voltage detection reference voltage setting section 31 applies reactive current correction to the difference between the detected value of the bus voltage Vh and the set voltage Vh0 set by a target voltage setting unit 90H, which has been obtained by the subtractor 21. The reactive power distributor 32 multiplies the obtained difference voltage by the gain KH to compensate the voltage drop especially at the part of the booster transformer Tr. The output limiter 34 limits the difference between the output of the phase compensation circuit section 33 and the generator terminal voltage Vg, which has been derived from the subtractor 21. The output of the power system voltage regulator PSVR is added to the generator terminal voltage deviation signal by the adder 24 in the automatic voltage regulator AVR, and adjusted by the adjuster 22 in the automatic voltage regulator AVR so that the magnetic field current is controlled via the thyristor 8.

The circuit structure allows the output of the power system voltage regulator PSVR to reach the magnetic field regulation via the adjuster 22 in the automatic voltage regulator AVR. In the present invention, the control gain of the magnetic field regulator is changed in accordance with the value of the power-system stability maintaining index VRI. The compensation circuit 20 as illustrated in FIG. 7 serves to change the proportional gain Ka of the adjuster as any one of a series of magnetic field regulators from the power system voltage regulator PSVR to the magnetic field regulation via the adjuster 22 in the automatic voltage regulator AVR. In other words, it is possible to change the proportional gain Ka of the adjuster in the open loop transfer function with respect to the power system voltage regulating system. In FIG. 9, the proportional gain Ka of the adjuster 22 in the automatic voltage regulator AVR is changed.

Specifically, in the control device, the control gain to be changeable includes the gain of the adjuster 22 in the automatic voltage regulator AVR similar to the one as illustrated in FIG. 7, and the control gain KH in the power system voltage regulator PSVR. The present invention is applicable to any one of those changeable gains. This also applies to other control devices to be described below.

The compensation circuit 20 is required to have different characteristics in compliance with the case of changing the gain of the adjuster 22 in the automatic voltage regulator AVR and the case of changing the control gain of the adjuster in each of the control devices. Therefore, the function has to be determined in accordance with the individual case. In the case where the gain of the adjuster 22 in the automatic voltage regulator AVR is changed under any control while having the control gain of the individual control device kept unchanged, the control gain cannot be necessarily optimized depending on the control device. There may be the case that the resultant effect that has been levelled to a certain degree needs to be accepted.

An explanation will be made with respect to the sequence of controlling the power system voltage using the power system voltage regulator PSVR. The bus voltage Vh is detected and loaded into the power system voltage regulator PSVR. The processing result is reflected on the voltage deviation of the automatic voltage regulator AVR so that the magnetic field current is fixed thereby. The terminal voltage of the generator is then changed, which is reflected on the power system voltage Vh via the transformer transmission line.

The control device as illustrated in FIG. 9 is operated under the cascade control executed by the power system voltage regulator PSVR and the automatic voltage regulator AVR. The process executed under the cascade control includes two types, that is, one for determining the set voltage of the automatic voltage regulator AVR based on the output of the power system voltage regulator PSVR, and another for adding the output of the power system voltage regulator PSVR to the voltage deviation of the automatic voltage regulator AVR. The control can be executed through the process of either type. In either case, the voltage deviation of the automatic voltage regulator AVR is regulated in the end. This applies to the processing of other control systems that substantially execute the cascade control.

Upon execution of the control as described above, in response to drop in the power system voltage, the power system voltage regulator PSVR is operated to increase the set voltage of the automatic voltage regulator AVR so that the magnetic field current is increased as illustrated in FIG. 3. Simultaneously, the synchronous inductance varies with the magnetic field current to deteriorate the optimum response characteristic of the generator. The present invention is configured to change the control gain in accordance with the value of the power-system stability maintaining index VRI, resulting in improved responsiveness.

In the control device of cascade type as illustrated in FIG. 9, the operation of the compensation circuit 20 may be applied to at least one of the upstream-side control device and the downstream-side control device. Each compensation circuit is disposed at each of the applied positions. The compensation circuit may be applied to the proportional gain or/and integration time constant. If it is applied to both the proportional gain and the integration time constant, the compensation circuits are disposed for both devices, respectively. This applies to the control device of cascade type to be described below.

Fifth Embodiment

The fifth embodiment relates to the automatic reactive power regulator AQR as the specific regulation target. The automatic reactive power regulator AQR is a device for automatically regulating the magnetic field current so that the value of the reactive power output of the generator becomes the reference value given by a function of the active power output. This type may be applied to the thermal power plant and the pumped storage power plant, which are located near the demand end, and exhibit high reactive power regulating effects for the purpose of reducing transmission loss and optimizing the reactive power flow.

Figure 10:
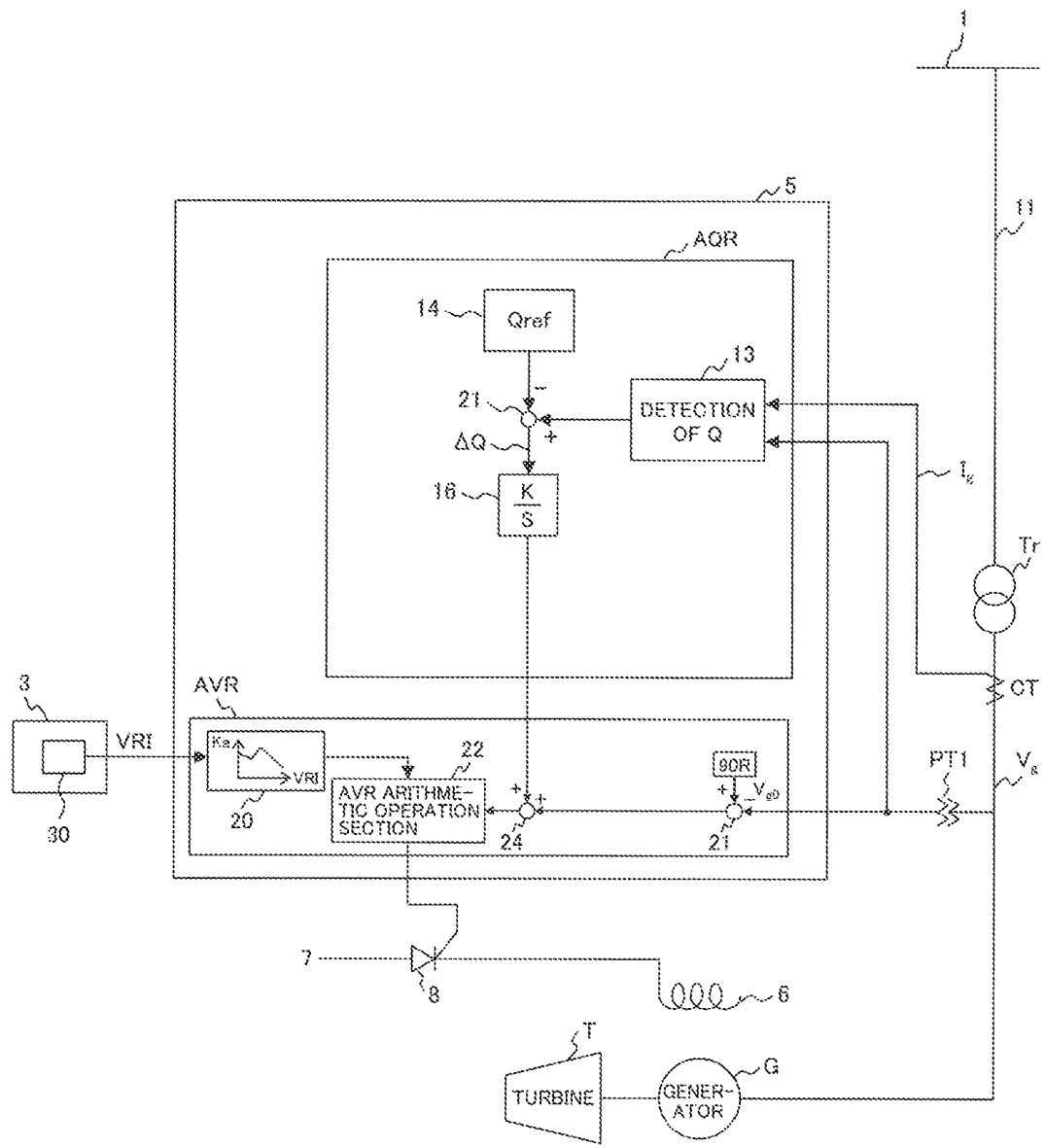
FIG. 10 illustrates a specific exemplary structure of an automatic reactive power regulator AQR.

FIG. 1 illustrates an exemplary structure of the magnetic field regulator 5 provided with the automatic reactive power regulator AQR. FIG. 10 illustrates a specific exemplary structure of the automatic reactive power regulator AQR. Referring to FIG. 10, a reactive power detector 13 obtains the reactive power from the generator terminal voltage Vg and the load current Ig. The subtractor 21 obtains a difference AQ between the obtained reactive power and the set reactive power given by a reactive power setting section 14. The obtained difference is integrated by an integral circuit 16, and set as the set voltage. The value is then reflected on the set voltage of the automatic voltage regulator AVR.

In the fifth embodiment, the proportional gain Ka may be made changeable in accordance with the value of the power-system stability maintaining index VRI in the similar way to that of the above-described embodiment.

The automatic reactive power regulator AQR as illustrated in FIG. 10 includes the compensation circuit 20 which receives an input of the power-system stability maintaining index VRI to give an appropriate control gain so that the control gain in the magnetic field regulator is changed. When the value of the power-system stability maintaining index VRI is large, the compensation circuit 20 reduces the control gain of the adjuster of the magnetic field regulator. In such a case, the adjuster making the control gain changeable in the magnetic field regulator may be suitably determined. Referring to FIG. 10, the proportional gain Ka of the adjuster 22 in the automatic voltage regulator AVR is made variable.

Sixth Embodiment

The sixth embodiment relates to the automatic power factor regulator APFR as the specific regulation target. The automatic power factor regulator APFR is a device for automatically regulating the magnetic field current so that the generator power factor is kept constant. In most cases, the automatic power factor regulator APFR is disposed to cope with overcurrent of the generator as a result of generating reactive power required for keeping the generator voltage constant by the small-capacity generator.

Figure 11:
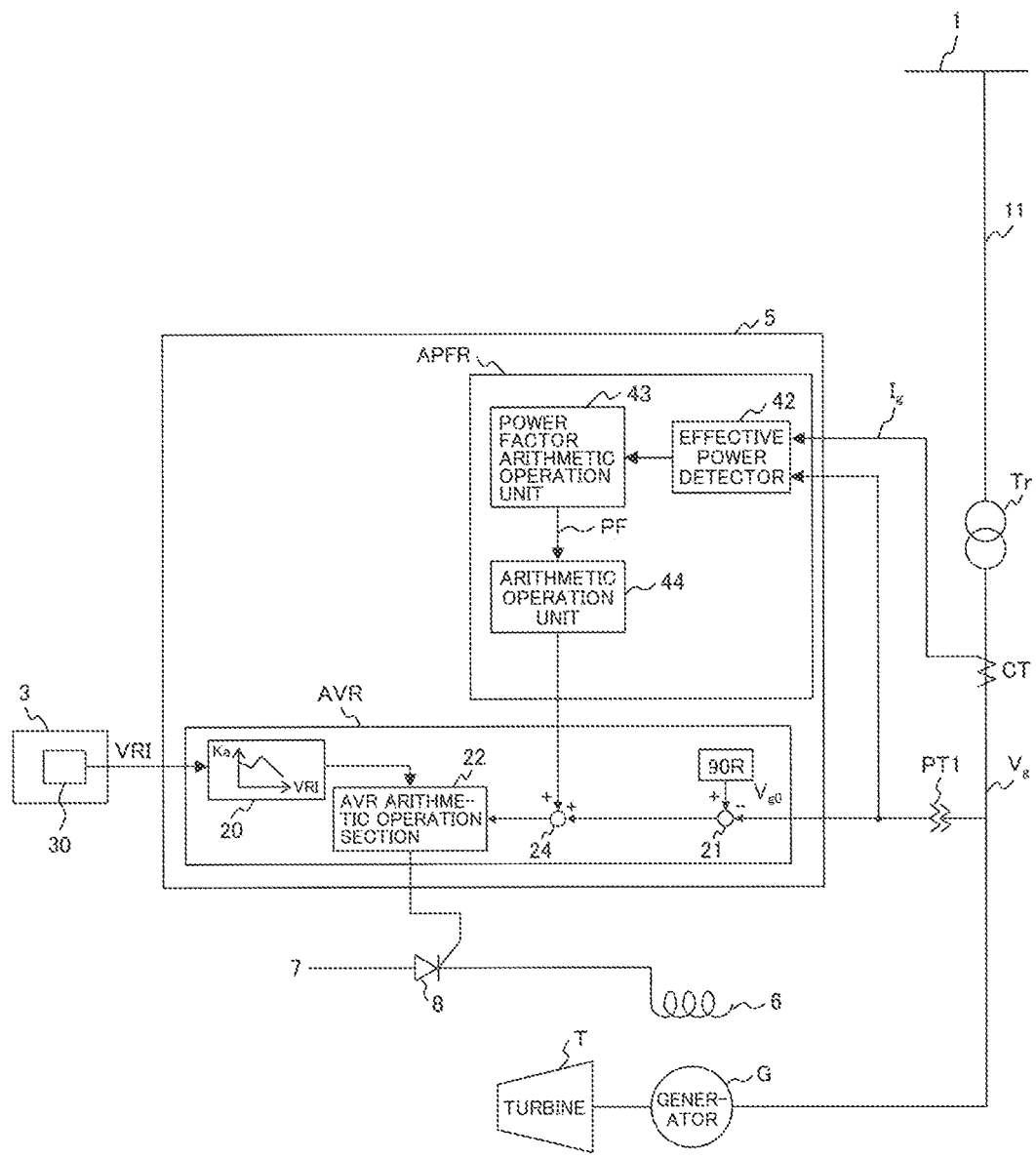
FIG. 11 illustrates a specific exemplary structure of an automatic power factor regulator APFR.

FIG. 1 illustrates an exemplary structure of the magnetic field regulator 5 provided with the automatic power factor regulator APFR. FIG. 11 illustrates a specific exemplary structure of the automatic power factor regulator APFR. Referring to FIG. 11, in the automatic power factor regulator APFR, an active power detector 42 detects the active power of the generator G, and a power factor arithmetic operation unit 43 obtains the power factor PF. An arithmetic operation unit 44 executes the process in accordance with the difference between the target power factor and the measured power factor. The processing result is reflected on the voltage deviation of the automatic voltage regulator AVR. The method to be implemented upon reflection of the result on the voltage deviation includes the one for changing the set voltage of the target voltage setting unit 90R, and the other one for adding to the voltage deviation. The present invention is applicable to the method of either type. This applies to other control devices.

The automatic power factor regulator APFR as illustrated in FIG. 11 includes the compensation circuit 20 which receives an input of the power-system stability maintaining index VRI to give an appropriate control gain so that the control gain in the magnetic field regulator is changeable. When the value of the power-system stability maintaining index VRI is large, the compensation circuit 20 reduces the control gain of the adjuster of the magnetic field regulator. Referring to FIG. 11, the proportional gain Ka of the adjuster 22 in the automatic voltage regulator AVR is made changeable. In the case as described in the sixth embodiment, the adjuster making the control gain changeable in the magnetic field regulator may be suitably determined.

Seventh Embodiment

The seventh embodiment relates to the power system stabilizer PSS as the specific regulation target. The power system stabilizer PSS is configured to quickly increase the magnetic field current immediately in response to variation in the generator terminal voltage upon occurrence of accident, and increase synchronizing power by raising the internal induced voltage of the generator so that stability is improved. This ensures to significantly improve stability of dynamics upon operation at leading power factor, which may result especially in the stability problem. The employment of the high-speed automatic voltage regulator AVR with high gain enhances the synchronizing power. On the other hand, the braking force is weakened. Depending on system configurations and operation conditions, the automatic voltage regulator AVR may cause the risk of secondary fluctuation. In order to cope with such risk, the variation in the rotational speed or output of the generator is detected, and the stabilizing signal is input to the automatic voltage regulator AVR so that the braking force is enhanced.

Figure 12:
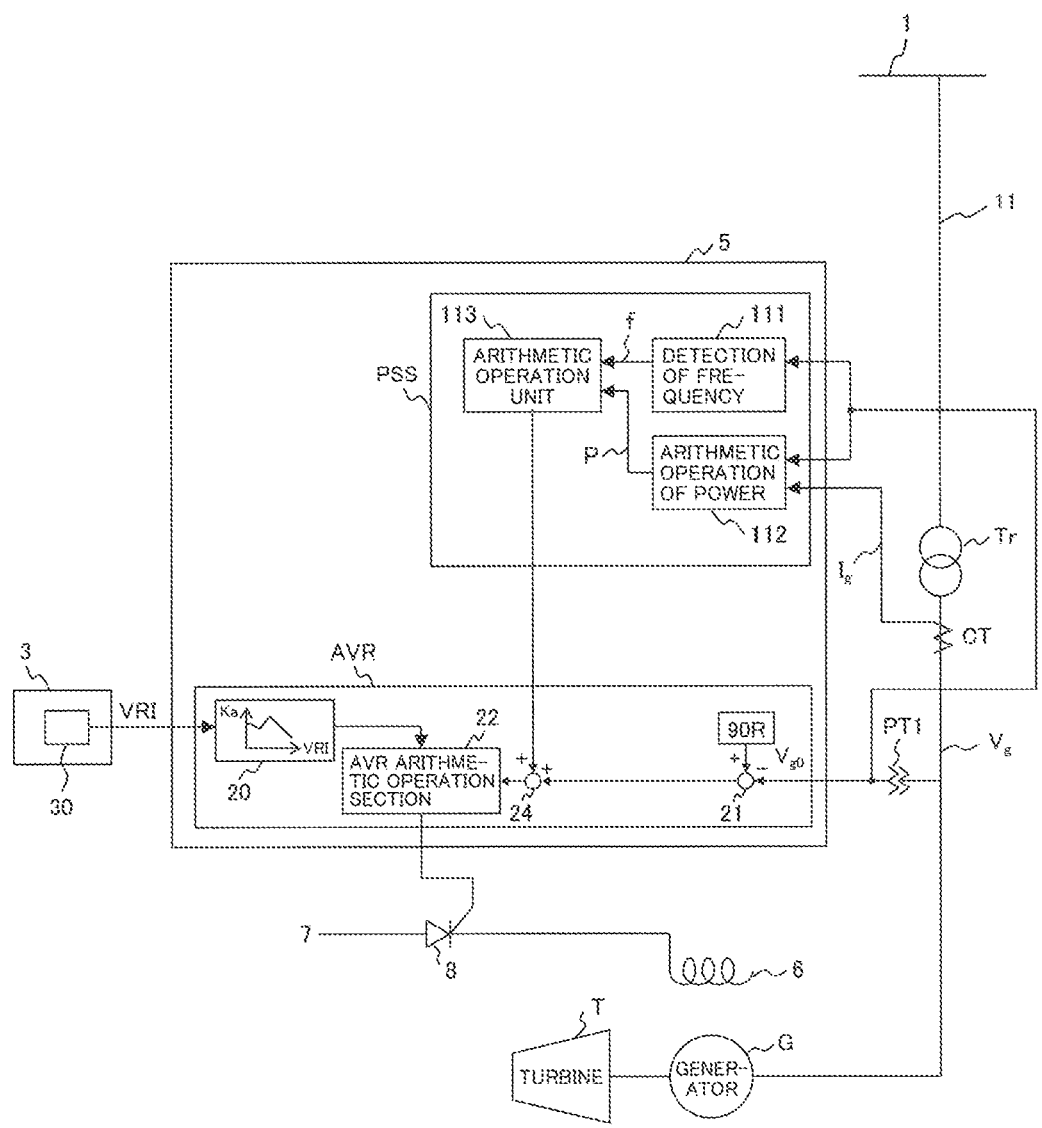
FIG. 12 illustrates a specific exemplary structure of a power system stabilizer PSS.

FIG. 1 illustrates an exemplary structure of the magnetic field regulator 5 provided with the power system stabilizer PSS. FIG. 12 illustrates a specific exemplary structure of the power system stabilizer PSS. Referring to FIG. 12, an arithmetic operation unit (power variation computing unit) 113 obtains a system stabilization signal from the system frequency f detected by a frequency detector 111, and the active power P detected by a power calculation unit 112. The voltage deviation of the automatic voltage regulator AVR is corrected using the signal.

The compensation circuit 20 that is similar to the one as described in the first embodiment allows the system to achieve the initial object of the present invention. Referring to FIG. 12, the proportional gain Ka of the adjuster (AVR arithmetic operation section) in the automatic voltage regulator AVR is made changeable.

Eighth Embodiment

In the eighth embodiment, a proposal is made with respect to change in adjustment of the control gain of the adjuster as described from the first to the seventh embodiments in accordance with the operation condition of the generator side.

The operation condition is distinguished by startup timing, normal output operation timing, stopped timing, and the like. Although the magnetic field current is the same in those operation conditions, the control gain is set to the value adapted to each of the conditions. This applies to the case as expressed by the equation (3) indicating that the proportional gain Ka of the adjuster 22 is different depending on each of the respective operation conditions.

The system according to the sixth embodiment allows operations using the control gain optimized in accordance with the operation condition.

The first to the eighth embodiments relate to the magnetic field regulator of the generator configured to change the magnetic field in accordance with the power-system stability maintaining index VRI. The power-system stability maintaining index VRI may be set either by the control center or the individual electric power station. It may be applied to arbitrary control system in the magnetic field regulator of the generator.

Those embodiments may be summarized as follows. The power system stabilization system includes the magnetic field regulator for controlling the synchronous machine to be field-regulated. The synchronous machine disposed in the power plant is connected to the power system. The power system stabilization system includes the compensation circuit for correcting the control gain of the magnetic field regulator for the synchronous machine in accordance with the power-system stability maintaining index reflecting the renewable energy amount in the power system.

Ninth Embodiment

In the ninth to the eleventh embodiments, explanations will be made with respect to the power demand-supply adjusting function between mechanical inputs and electrical outputs with respect to the generator for securing the frequency adjusting function in accordance with the power-system stability maintaining index VRI.

In other words, each of those cases relates to operations for controlling the prime mover which applies the mechanical input to the generator so that the mechanical input is changed in accordance with the power-system stability maintaining index VRI. The mechanical input may be changed through adjustment of the output command value D given by the control center, or through adjustment by the control device at the power plant side. In the ninth embodiment, an explanation will be made with respect to adjustment of the output command value D given by the control center. In the tenth and eleventh embodiments, explanations will be made with respect to adjustment performed by the control devices at the power plant side.

The ninth embodiment relates to the central control function section 50 in the control center 3 as illustrated in FIG. 1, which is operated in accordance with the power-system stability maintaining index VRI. In the central control function section 50, the load frequency control LFC is executed.

Figure 13:
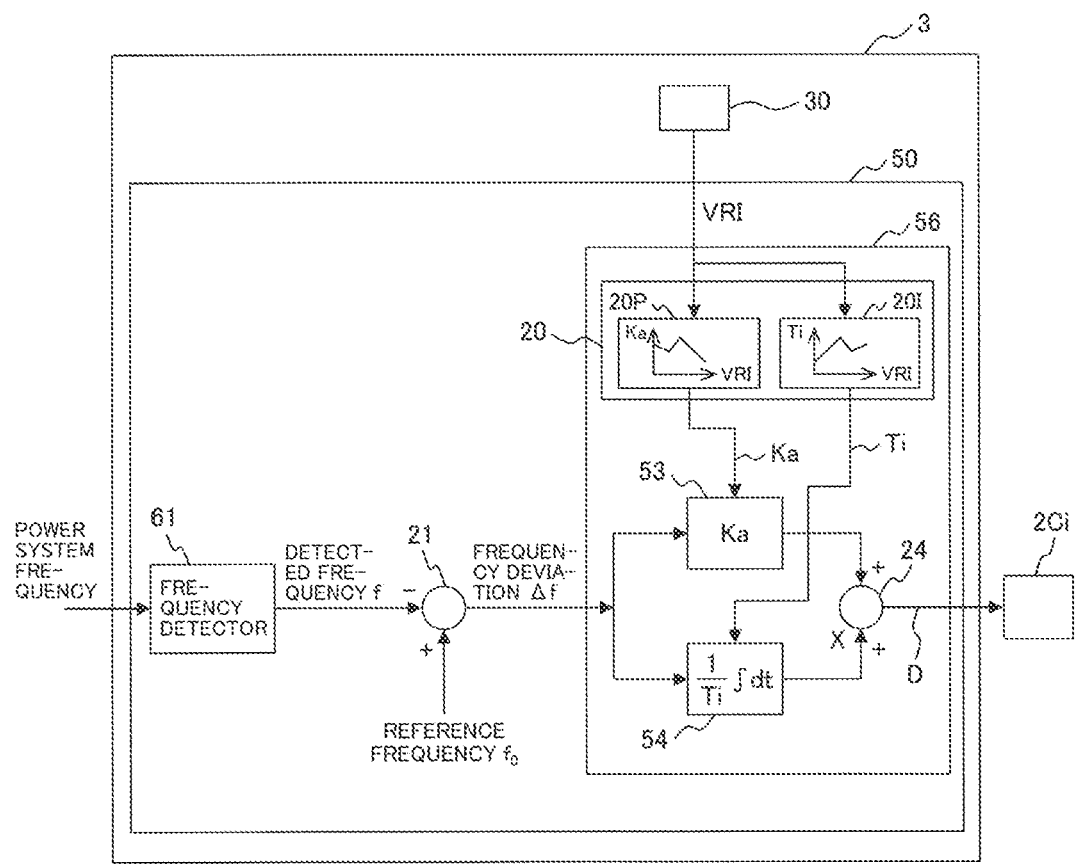
FIG. 13 is an arithmetic operation block diagram under a load frequency control LFC.

As FIG. 13 exemplifies the structure of the central control function section 50, the subtractor 21 obtains the deviation (frequency deviation $\Delta f$) between the system frequency f detected by a frequency detector 61 and a reference frequency $f_0$. A proportional arithmetic operation section 53 and an integral arithmetic operation section 54 obtain a proportional part and an integral part, respectively, which are added by the adder 24 to provide a proportion integral signal. Distribution of the signal as the output command value D (D1, D2 . . . Dn) to the conventional power plant 2C is commanded.

Assuming that the proportional gain is Ka and the integration time constant is Ti, the arithmetic operation performed by the adjuster 56 may be expressed by an equation (6):

$$\text{Output of adjuster } 56 = Ka \times \Delta f + (1/Ti)\int \Delta f \, dt. \quad (6)$$

In the case of the output command value D1 to the specific power plant (2C1), the compensation circuit 20 corrects the control gain of the adjuster in accordance with the power-system stability maintaining index VRI to reflect the corrected gain on the proportional arithmetic operation section 53 and the integral arithmetic operation section 54 of the adjuster 56. Specifically, the compensation circuit 20 includes a compensation circuit 20P for the proportional gain Ka and a compensation circuit 20I for the integration time constant Ti so that the compensated values of Ka and Ti are reflected on the proportional arithmetic operation section 53 and the integral arithmetic operation section 54, respectively.

The specific power plant 2C1 which has received the corrected output command value D1 is expected to control the mechanical input of the prime mover in the power plant controller 4. Unlike other power plants which have received uncorrected output command values D, the specific power plant executes the mechanical input control on which the renewable energy amount is reflected. This makes it possible to improve the frequency response control of the power system.

Tenth Embodiment

The tenth embodiment describes an exemplary case especially relating to an automatic plant control device APC of the power plant controller 4 in the specific power plant 2C1 as illustrated in FIG. 1 for control operations in accordance with the power-system stability maintaining index VRI.

Figure 14:
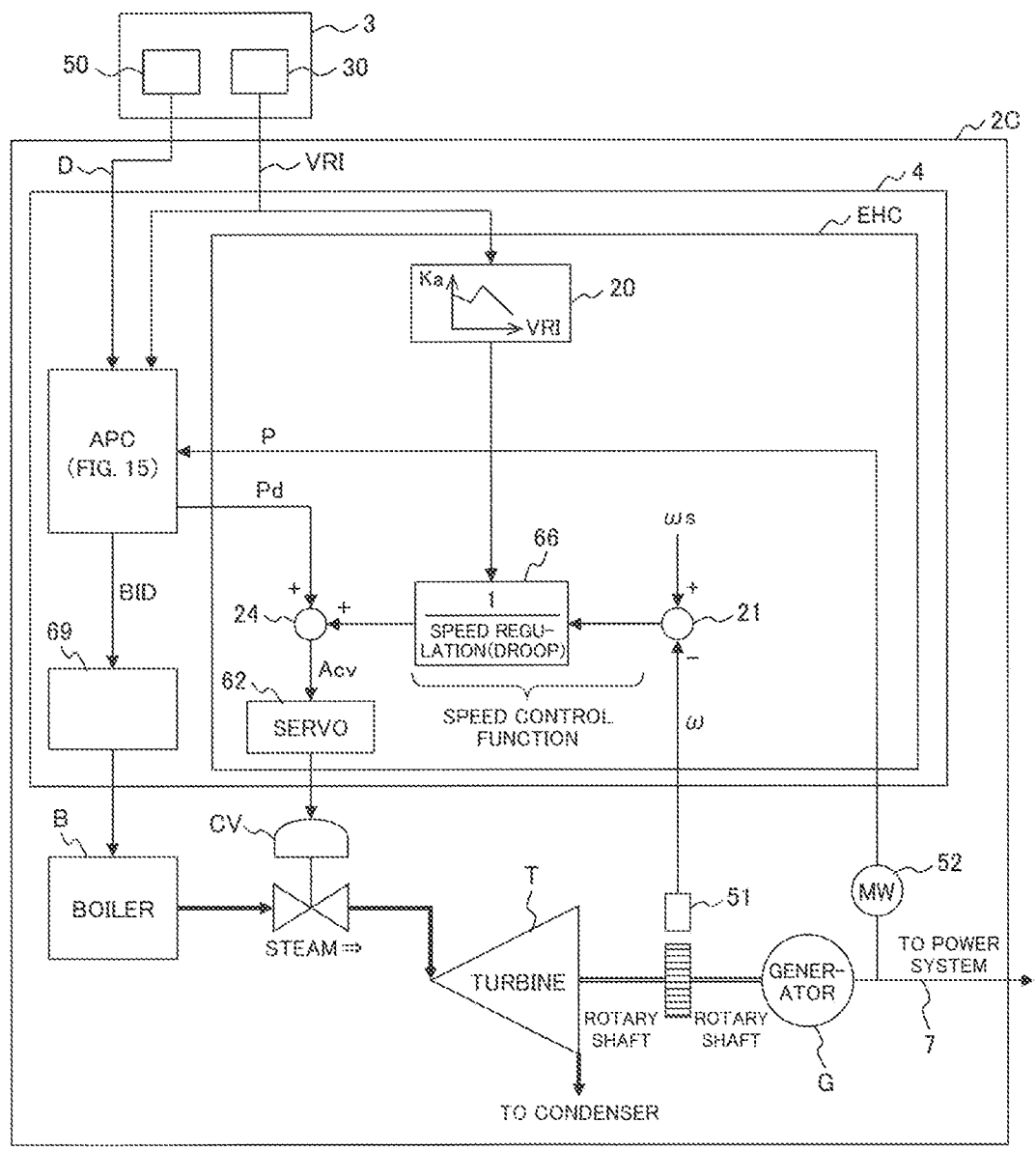
FIG. 14 illustrates an exemplary structure of a power plant controller 4 in a thermal power plant.

FIG. 14 illustrates an example of typical structure of the power plant controller 4 in the thermal power plant. Referring to the drawing, the structure of the main machine including the boiler B, the turbine T, and the generator G is substantially the same as the one as illustrated in FIG. 1 except that steam generated by the boiler B is supplied to the turbine T via the steam control valve CV. Accordingly, explanations of the same structure will be omitted.

Figure 15:
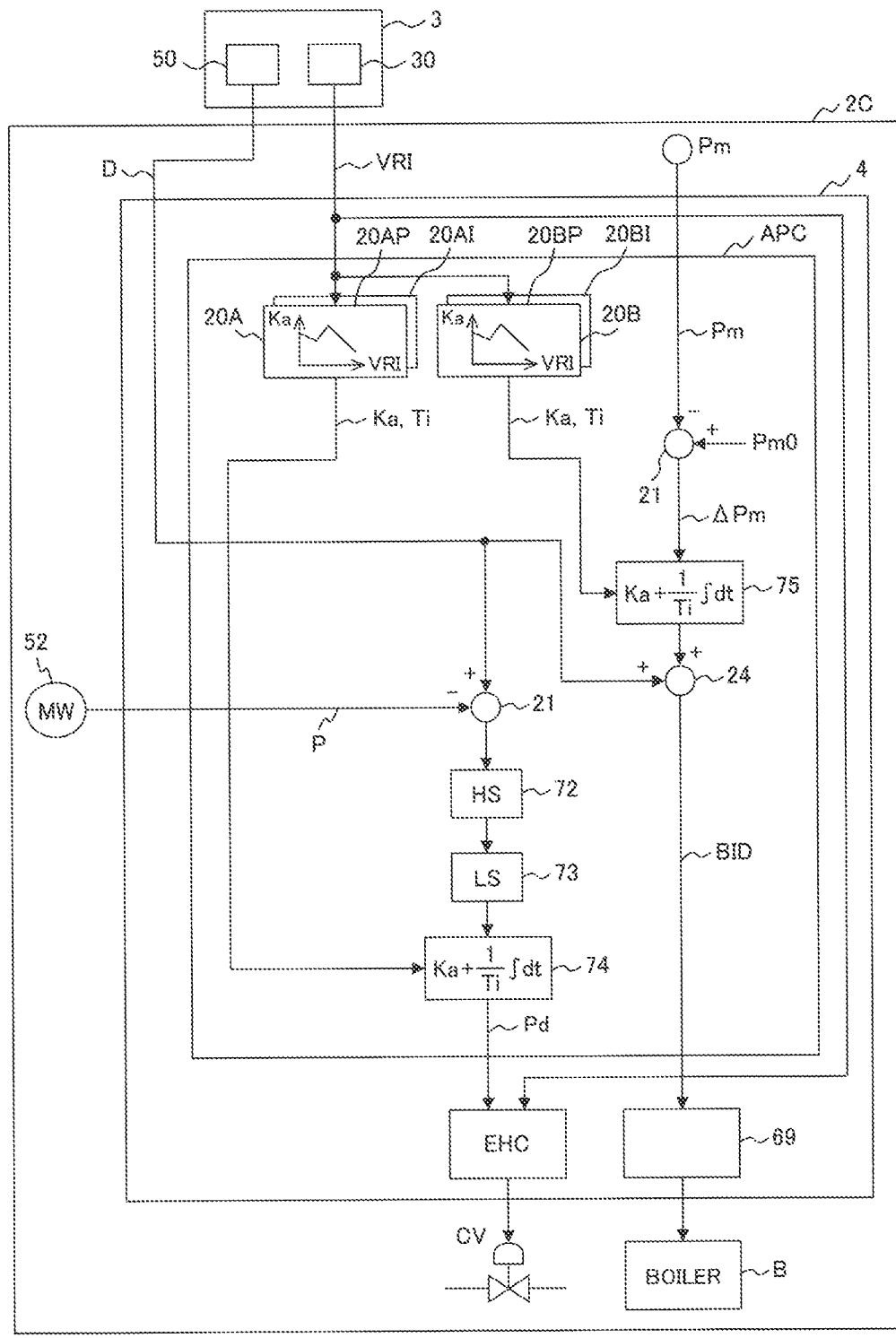
FIG. 15 illustrates an exemplary structure of an automatic plant controller APC.

The automatic plant control device APC and the turbine control device EHC serve as main control functions of the power plant controller 4. The automatic plant control device APC receives the output command value D from the control center 3, and gives a boiler control command BID to a boiler control device 69, and a load command Pd to the turbine control device EHC. Referring to FIG. 15, the automatic plant control device APC will be described as the tenth embodiment. Referring to FIG. 14, the turbine control device EHC will be described as the eleventh embodiment.

FIG. 15 illustrates an exemplary structure of the automatic plant control device APC. The boiler control command BID is obtained in the following process steps. The subtractor 21 obtains a main steam pressure deviation ΔPm as the deviation of a main steam pressure Pm applied to the turbine from the set pressure Pm0. An adjuster 75 executes the proportional integration of the resultant value. The adder 24 adds the output command value D from the control center 3 to the output of the adjuster 75 so that the boiler control command BID to the boiler control device 69 of the boiler B is obtained. The boiler control command is obtained by correcting the output command value D using the main steam pressure deviation ΔP.

The load command Pd to the turbine control device EHC in the automatic plant control device APC as illustrated in FIG. 15 is obtained in the following process steps. The subtractor 21 obtains a deviation (load deviation) between the output command value D and a generator output P obtained by the power detector 52. The obtained value is converted into a load variation rate as the value between a high load variation rate limit value and a low load variation rate limit value in a high load variation rate limiting circuit 72 and a low load variation rate limiting circuit 73. The resultant value becomes an appropriate load variation rate. The adjuster 74 executes the proportional integration of the load deviation to generate the load command Pd to the turbine control device EHC.

The adjusters 74, 75 of the automatic plant control device APC as described above are allowed to correct the control constants in accordance with the power-system stability maintaining index VRI. In other words, a compensation circuit 20A is provided for the adjuster 74 and a compensation circuit 20B is provided for the adjuster 75. In the case where proportional gains and integration time constants of the adjusters 74 and 75 are individually changed by the compensation circuits 20A, 20B, four units of the compensation circuits in total are provided.

In the illustrated example, the compensation circuit 20A for the adjuster 74 includes a compensation circuit 20AP for the proportional gain Ka, and a compensation circuit 20AI for the integration time constant Ti. The compensation circuit 20B for the adjuster 75 includes a compensation circuit 20BP for the proportional gain Ka and a compensation circuit 20BI for the integration time constant. The proportional gain Ka is set to the smaller value as the power-system stability maintaining index VRI becomes larger. Meanwhile, the integration time constant Ti is set to the larger value as the power-system stability maintaining index VRI becomes larger.

Especially, the load command Pd may be obtained by the adjuster 74 serving as the essential component in the following process steps. Under the load control, the load command Pd is obtained through the proportional integral arithmetic operation by the adjuster 74 as expressed by an equation (7) using the output command value D designated by the control center 3 and the generator output P detected by the generator:

$$Pd\ [\%] = Ka \times (D-P) + (1/Ti) \times \int (Ps-P) dt. \quad (7)$$

In the equation, the term Ka denotes the proportional gain, GI denotes the integral gain, Ti denotes the integration time, and t denotes time. Other control constants are kept constant.

Upon reception of the boiler control command BID, the boiler control device 69 allows a fuel control system, an air control system, and a water supply control system to control fuel, air, and water, which will be supplied to the boiler in accordance with the boiler control command BID. The fuel control system, the air control system, and the water supply control system at the downstream side are allowed to execute compensation by correcting the control gain in accordance with the power-system stability maintaining index VRI instead of compensation in the automatic plant controller APC at the upstream side.

More specifically, although not illustrated in the drawing, the controller includes the main control device which processes the boiler control command BID derived from the output command value D given to the power plant 2C1, and a fuel target value, an air target value, and a water supply target value each in accordance with the deviation of the generator output, and such control devices as a fuel control device, an air control device, and a water supply control device for processing fuel control signals, air control signals, and water supply control signals in accordance with each deviation between the target values and the corresponding feedback values, respectively. Each of those control devices is provided with the adjuster for executing proportional integral control of an input deviation (generator output deviation, fuel amount deviation, water supply amount deviation, air amount deviation). It is possible to provide an effect for improving the power system stability by correcting the control gain in accordance with the power-system stability maintaining index VRI.

It takes a long time to improve the power system stability through the boiler control device. In order to achieve the improvement in a shorter time, it is effective to operate the turbine control device EHC to be described in the eleventh embodiment. The operation for the turbine control device EHC is expressed by the equation (7).

Eleventh Embodiment

The eleventh embodiment describes an exemplary case especially relating to the turbine control device EHC of the power plant controller 4 in the specific power plant 2C1 as illustrated in FIG. 1 for control operations in accordance with the power-system stability maintaining index VRI.

FIG. 14 illustrates an exemplary structure of the turbine control device EHC. The turbine control device EHC adjusts a turbine load and a rotational speed ω of the turbine T. In the case of the turbine load adjustment, the load command Pd in the equation (7) is given to the steam control valve CV via the adder 24 and a servo mechanism 62. An opening degree of the valve is controlled so that the turbine load is adjusted.

The rotational speed ω of the turbine T is detected by the rotational speed detector 51. The subtractor 21 obtains a difference between the detected rotational speed and the reference speed ωs. An adjuster 66 multiplies the difference by a constant ratio. The adder 24 adds the resultant value to the load command Pd, and gives the added result to the steam control valve CV via the servo mechanism 62. The rotational speed ω is adjusted by controlling the opening degree of the valve. As a result, the output from the adder 24 may be referred to as the speed or the load signal.

The turbine or the generator is controlled by executing the arithmetic operation as expressed by an equation (8):

$$Acv\ [\%]=(\omega s-\omega)/C+Pd \quad (8)$$

using the rotational speed ω of the turbine or the generator, and the predetermined reference speed ωs, and the load command Pd, and controlling the opening degree (Acv) of the steam control valve CV for adjusting the flow rate of steam flowing into the turbine based on the arithmetically operated result. In the equation (8), the term C denotes a constant.

In the eleventh embodiment, the adjuster 66 corrects the control gain in accordance with the power-system stability maintaining index VRI. The constant C (=1/speed regulation (droop)) of the adjuster 66 is corrected by the control gain in accordance with the power-system stability maintaining index VRI.

The hydroelectric power plant or the nuclear power plant has similar prime mover input control systems and similar speed control systems so that the control gain for executing the proportional integral control of each input deviation can be corrected in accordance with the power-system stability maintaining index VRI.

The ninth to the eleventh embodiments relate to controlling operations of the prime mover for applying the mechanical inputs to the generator, and have described with respect to change in the mechanical input in accordance with the power-system stability maintaining index VRI. In the ninth embodiment, the mechanical input is changed by adjusting the output command value D given by the control center. In the tenth and eleventh embodiments, the automatic plant control device APC and the turbine control device EHC are operated each as the control device in the power plant. In the above-described operations, the control gain of the control device of the prime mover is directly or indirectly corrected. In this case, the central control function in the control center 3 may be broadly regarded as the control device of the prime mover.

Those embodiments may be summarized as follows. The power system stabilization system includes the prime mover control device for controlling the prime mover. The synchronous machine driven by the prime mover and field-regulated is disposed in the power plant connected to the power system. The power system stabilization system includes the compensation circuit for correcting the control gain of the prime mover control device in accordance with the power-system stability maintaining index reflecting the renewable energy amount in the power system.

Twelfth Embodiment

The twelfth embodiment describes an exemplary application to other devices.

In the first to the seventh embodiments, the present invention is applicable to the magnetic field regulator 5 so long as it is the synchronous machine. The synchronous machine includes a synchronous phase modifier (rotary capacitor). The synchronous phase modifier is a synchronous motor operated under no load, which is one of phase modifying facilities. The synchronous phase modifier is field-regulated by the automatic voltage regulator AVR, which is configured similarly to the one as illustrated in FIG. 7 except that the synchronous phase mobilizer as the synchronous motor is not driven by the turbine.

The application of the present invention to the synchronous phase modifier provides advantageous effects as follows. Firstly, regulation of the magnetic field current allows continuous adjustment of the reactive power in a broad range from supply to absorption of the reactive power. Secondly, the internal induced voltage achieves the self-voltage to allow supply of constant reactive power even in the case of the system voltage drop.

The twelfth embodiment with respect to the synchronous phase modifier may be summarized as follows. In the power system stabilization system, the synchronous motor is connected to the power system, and field-regulated by the magnetic field regulator. The power system stabilization system includes the compensation circuit for correcting the control gain of the magnetic field regulator for the synchronous machine in accordance with the power-system stability maintaining index reflecting the renewable energy amount in the power system.

The present invention is also applicable to the phase modifier such as STATCOM and SVC. The SVC (static var compensator) as one of the static phase modifying facilities generally includes the step-down transformer, serial coil, phase advance capacitor, and high-voltage-large-capacity thyristor device. The reactive power is continuously varied under the load by executing high-speed control using the power semiconductor. This makes it possible to execute the reactive power compensation at high response speed. As the adjuster for the reactive power control is contained, such adjuster may be used for correcting the control gain in accordance with the power signal stability maintaining index VRI.

The STATCOM as one of the static phase modifying facilities generally includes the step-down transformer, an inverter using IGBT or the like, and the capacitor. The reactive power is continuously varied under the load by executing high-speed control of the inverter. This makes it possible to execute the reactive power compensation at high response speed. As the inverter includes the adjuster for reactive power control, such adjuster may be used for correcting the control gain in accordance with the power-system stability maintaining index VRI.

Figure 16:
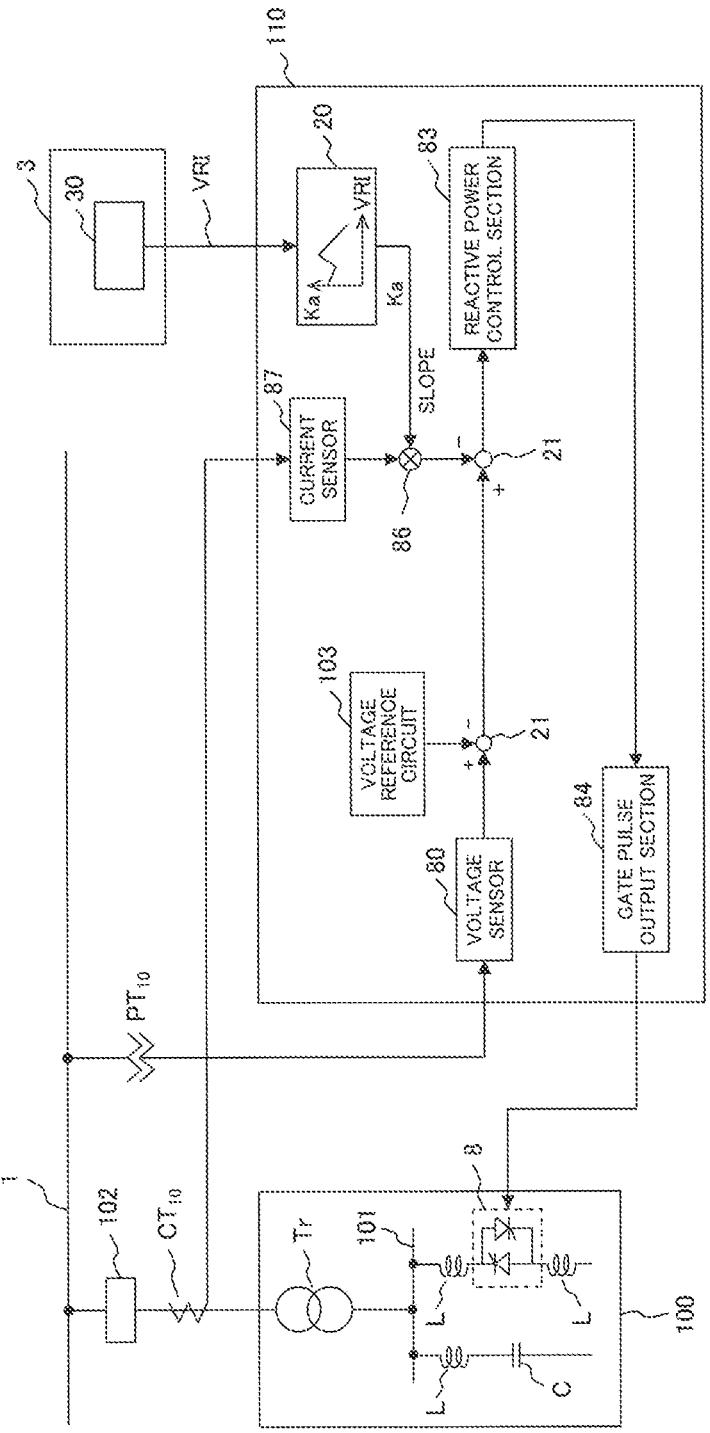
FIG. 16 illustrates an exemplary structure of a static var compensator SVC.

FIG. 16 illustrates an exemplary case of applying the present invention to the SVC. Referring to the drawing, a static reactive power compensation device 100 is connected to a transmission line 1 via a breaker 102. The static reactive power compensation device 100 is formed of a series circuit or a parallel circuit consisting of the transformer Tr having its primary side connected to the transmission line, and a coil L, a capacitor C and the thyristor 8, which are all connected to a bus 101 at a secondary side of the transformer.

An SVC control device 110 allows a voltage transformer PT10 for measuring the voltage of the transmission line 1 and a current transformer CT10 for measuring the current flowing through the static reactive power compensation device 100 to load the voltage and the current so that the voltage of the transmission line 1 is controlled through the static reactive power compensation device 100.

The SVC control device 110 includes a voltage sensor 80, a reference voltage circuit 103, a current sensor 87, a multiplier 86, the subtractor 21, a reactive power control section 83, and a gate pulse output section 84. In the case where the subtractor 21 detects that the system voltage output from the voltage sensor 80 drops below the set voltage given by the reference voltage circuit 103, the SVC control device 110 controls the static reactive power compensation device 100 by supplying the phase advance reactive power via the reactive power control section 83. If it is detected that the system voltage is increased, the static reactive power compensation device 100 is controlled to supply the phase delay reactive power.

The SVC control device 110 determines a slope characteristic having the voltage signal varied in a predetermined rate in response to change in the reactive power generated in the static reactive power compensation device 100. The multiplier 86 executes the function by multiplying the current signal output by the current sensor 87 by the predetermined gain. In the embodiment as illustrated in FIG. 16, such gain is set as a variable gain from the compensation circuit 20. The subtractor 21 outputs a difference obtained by subtracting a product of the current value output from the multiplier 86 and the gain from the compensation circuit 20 from the varied voltage as an output from a varied voltage generation section 41.

The SVC control device 110 obtains the reactive power output value of the static reactive power compensation device 100 through arithmetic operation, and outputs the obtained value so that the output of the subtractor 21 becomes zero. The reactive power control section 83 controls the bus voltage through arithmetic operation of the reactive power output value. The gate pulse output section 84 generates a gate pulse signal so that the arithmetically operated reactive power value is generated, and the signal is output to the thyristor 8 of the static reactive power compensation device 100. The static power compensation device 100 generates the reactive power in accordance with the gate pulse signal.

The present invention may be applied to the static reactive power compensation device 100 by changing the control gain of the SVC control device 110 in accordance with the power-system stability maintaining index VRI via the compensation circuit 20.

The present invention may also be applied to the STATCOM following the same basic idea. Although detailed illustrated explanations are omitted, the STATCOM connected to the transmission line includes the step-down transformer, the inverter using IGBT (power semiconductor), and the capacitor. The STATCOM control device is provided to control the IGBT (power semiconductor). The STATCOM control device includes a control section for controlling the reactive power to change the control gain in the control section in accordance with the power-system stability maintaining index reflecting the renewable energy amount in the power system.

The twelfth embodiment with respect to the SVC and the STATCOM may be summarized as follows. In the power-system stabilization system, the reactive power control device 110 (SVC control device or STATCOM control device) controls the reactive power compensation device 100 (SVC or STATCOM) including the capacitor (capacitor, accumulator, or battery) and the power semiconductor (thyristor or IGBT), which is disposed in the substation connected to the power system. The power-system stabilization system includes the compensation circuit 20 for correcting the control gain of the reactive power control device 110 in accordance with the power-system stability maintaining index reflecting the renewable energy amount in the power system.

LIST OF REFERENCE SIGNS

1: power system
2A: wind power plant
2B: solar power plant
2C1 to 2Cn: conventional power plant
3: control center
4: power plant controller
5: magnetic field regulator
6: magnetic field coil
7: AC generator
8: thyristor
10: load of overall power system
11, 12 to 1$n$: transmission line
14: reactive power setting section
20: compensation circuit
20AP, 20BP: compensation circuit for proportional gain Ka
20AI, 20BI: compensation circuit for integration time constant Ti
21: subtractor
22: adjuster (AVR arithmetic operation section)
24: adder
30: VRI arithmetic operation section
31: voltage detection reference voltage setting section
32: reactive power distributor
33: phase compensation circuit section
34: output limiter
42: active power detector
43: power factor arithmetic operation unit
44: arithmetic operation unit
50: central control function section 51: rotational speed detector
52: power detector
53: proportional arithmetic operation section
54: integral arithmetic operation section
56: adjuster
61, 111: frequency detector
62: servo mechanism
66: adjuster
69: boiler control device
72: high load variation rate limiting circuit
73: low load variation rate limiting circuit
74, 75: adjuster
80: voltage sensor
83: reactive power control section
84: gate pulse output section
86: multiplier
87: current sensor
90R, 90H: target voltage setting unit
100: static reactive power compensation device
101: bus at a secondary side of transformer
102: breaker
103: reference voltage circuit
110: SVC control device
112: power calculation unit
113: arithmetic operation unit
AVR: automatic voltage regulator
AQR: automatic reactive power regulator
APFR: automatic power factor regulator
B: boiler
C: capacitor
CT1, CT2, CT10: current transformer
CV: steam control valve
D1, D2 to Dn: output command value
f: power system frequency
f0: constant frequency
T: time constant
G: generator
If: DC magnetic field current
Ig: terminal current of generator
L: coil
Pm: main steam pressure
Pm0: set pressure
ΔPm: main steam pressure deviation
PSVR: power system voltage regulator
PSS: power system stabilizer
PT1, PT2, PT10: voltage transformer
Q: reactive power
T: turbine
Tr: transformer
Vg: generator terminal voltage
Vg0: set voltage
Vh: bus voltage
Vh0: reference voltage
ω: rotational speed of turbine
ωs: reference rotational speed of turbine

What is claimed is:

1. A power-system stabilization system comprising:
a synchronous machine to be field-regulated disposed in an electric power station connected to a power system;
a magnetic field regulator for controlling the synchronous machine; and
a compensation circuit for correcting a control constant of the magnetic field regulator in accordance with a power-system stability maintaining index that is an index reflecting a renewable energy amount in the power system.

2. The power-system stabilization system according to claim 1,
wherein the synchronous machine is a synchronous motor.

3. The power-system stabilization system according to claim 1,
wherein the power-system stability maintaining index is a composition ratio of renewable energy of the power system.

4. The power-system stabilization system according to claim 1,
wherein the power-system stability maintaining index is a voltage variation degree that indicates a variation degree of a power system voltage with respect to a reference value of the power system voltage.

5. The power-system stabilization system according to claim 1,
wherein the electric power station is connected to a central device via communication, and
wherein the electric power station receives the power-system stability maintaining index obtained by the central device and changes the control constant.

6. The power-system stabilization system according to claim 1,
wherein the electric power station executes an arithmetic operation to obtain the power-system stability maintaining index from information derived through communication and changes the control constant.

7. The power-system stabilization system according to claim 1,
wherein the magnetic field regulator includes an automatic voltage regulator AVR for operating current flowing through a magnetic field coil of the synchronous machine in accordance with a terminal voltage deviation of the synchronous machine; and
wherein the compensation circuit changes the control constant of the automatic voltage regulator AVR in accordance with the power-system stability maintaining index.

8. The power-system stabilization system according to claim 1,
wherein the magnetic field regulator includes a power system voltage regulator PSVR for adjusting a terminal voltage deviation of an automatic voltage regulator AVR in accordance with a linkage point voltage deviation of the synchronous machine, the automatic voltage regulator AVR operating current flowing through a magnetic field coil of the synchronous machine in accordance with a terminal voltage deviation of the synchronous machine; and
wherein the compensation circuit changes the control constant of the magnetic field regulator from the power system voltage regulator PSVR to the automatic voltage regulator AVR in accordance with the power-system stability maintaining index.

9. The power-system stabilization system according to claim 1,
wherein the magnetic field regulator includes an automatic reactive power regulator AQR for adjusting a terminal voltage deviation of an automatic voltage regulator AVR in accordance with a reactive power deviation of the synchronous machine, the automatic voltage regulator AVR operating current flowing through a magnetic field coil of the synchronous machine in accordance with a terminal voltage deviation of the synchronous machine; and wherein the compensation circuit changes the control constant of the magnetic field regulator from the automatic reactive power regulator AQR to the automatic voltage regulator AVR in accordance with the power-system stability maintaining index.

10. The power-system stabilization system according to claim 1,
wherein the magnetic field regulator includes an automatic power factor regulator APFR for adjusting a terminal voltage deviation of an automatic voltage regulator AVR to make a power factor of the synchronous machine constant, the automatic voltage regulator AVR operating current flowing through a magnetic field coil of the synchronous machine in accordance with a terminal voltage deviation of the synchronous machine; and
wherein the compensation circuit changes the control constant of the magnetic field regulator from the automatic power factor regulator APFR to the automatic voltage regulator AVR in accordance with the power-system stability maintaining index.

11. The power-system stabilization system according to claim 1,
wherein the magnetic field regulator includes a power system stabilizer PSS for adjusting a terminal voltage deviation of an automatic voltage regulator AVR in accordance with a power stabilizing signal obtained from power and system frequency of the synchronous machine, the automatic voltage regulator AVR operating current flowing through a magnetic field coil of the synchronous machine in accordance with a terminal voltage deviation of the synchronous machine; and
wherein the compensation circuit changes the control constant of the magnetic field regulator from the power system stabilizer PSS to the automatic voltage regulator AVR in accordance with the power-system stability maintaining index.

12. The power-system stabilization system according to claim 1,
wherein the compensation circuit reduces a control gain of the control constant when the power-system stability maintaining index is a large value.

13. The power-system stabilization system according to claim 1,
wherein the control constant is a control gain, an integral gain, or an integration time constant.

14. A power-system stabilization system comprising:
a synchronous machine driven by a prime mover, the synchronous machine disposed in an electric power station connected to a power system;
a prime mover control device for controlling the prime mover; and
a compensation circuit for correcting a control constant of the prime mover control device in accordance with a power-system stability maintaining index that is an index reflecting a renewable energy amount in the power system.

15. The power-system stabilization system according to claim 14,
wherein the power-system stability maintaining index is a frequency variation degree that indicates a variation degree of a power system frequency with respect to a reference value of the power system frequency.

16. The power-system stabilization system according to claim 14,
wherein the prime mover control device obtains a signal as an output command value, the signal generated by an adjuster through proportional integration of a frequency deviation of the power system; and
wherein a control constant of the adjuster is corrected in accordance with the power-system stability maintaining index.

17. The power-system stabilization system according to claim 14,
wherein the prime mover control device includes an adjuster for operating a prime mover input; and
wherein a control constant of the adjuster is corrected in accordance with the power-system stability maintaining index.

18. The power-system stabilization system according to claim 17,
wherein the adjuster operates the prime mover input by executing a proportional integral arithmetic operation of a difference between an output command value given to a power plant and a load of the synchronous machine.

19. The power-system stabilization system according to claim 17,
wherein the adjuster operates the prime mover input by executing a proportional arithmetic operation of a difference between a rotational speed of the prime mover and a reference rotational speed.

20. A power-system stabilization system comprising:
a reactive power compensation device including a capacitor and a power semiconductor, the reactive power compensation device disposed in an electric power station connected to a power system;
a reactive power control device for controlling the reactive power compensation device; and
a compensation circuit for correcting a control constant of the reactive power control device in accordance with a power-system stability maintaining index that is an index reflecting a renewable energy amount in the power system.

21. A power-system stabilization method for a power system which an electric power station is connected to, the electric power station including a synchronous machine to be field-regulated, the synchronous machine being controlled by a magnetic field regulator,
wherein the power-system stabilization method comprises correcting a control constant of the magnetic field regulator in accordance with a power-system stability maintaining index that is an index reflecting a renewable energy amount in the power system.

22. The power-system stabilization method according to claim 21,
wherein the synchronous machine is a synchronous motor.

23. The power-system stabilization method according to claim 21,
wherein the power-system stability maintaining index is a composition ratio of renewable energy of the power system.

24. The power-system stabilization method according to claim 21,
wherein the power-system stability maintaining index is a voltage variation degree that indicates a variation degree of a power system voltage with respect to a reference value of the power system voltage.

25. The power-system stabilization method according to claim 21,
wherein a control gain of the control constant is reduced when the power-system stability maintaining index is a large value.

26. A power-system stabilization method for a power system which an electric power station is connected to, the electric power station including a synchronous machine driven by a prime mover, the prime mover being controlled by a prime mover control device,
- wherein the power-system stabilization method comprises correcting a control constant of the prime mover control device in accordance with a power-system stability maintaining index that is an index reflecting a renewable energy amount in the power system.

27. The power-system stabilization method according to claim 26,
- wherein the power-system stability maintaining index is a frequency variation degree that indicates a variation degree of a power system frequency with respect to a reference value of the power system frequency.

28. A power-system stabilization method for a power system which an electric power station is connected to, the electric power station including a reactive power compensation device including a capacitor and a power semiconductor, the reactive power compensation device being controlled by a reactive power control device,
- wherein the power-system stabilization method comprises correcting a control constant of the reactive power control device in accordance with a power-system stability maintaining index that is an index reflecting a renewable energy amount in the power system.

* * * * *